United States Patent
Owoeye

(10) Patent No.: US 12,264,627 B2
(45) Date of Patent: Apr. 1, 2025

(54) HEAT EXCHANGER FOR A GAS TURBINE ENGINE

(71) Applicant: General Electric Company, Schenectady, NY (US)

(72) Inventor: Eyitayo James Owoeye, Houston, TX (US)

(73) Assignee: General Electric Company, Evendale, OH (US)

( * ) Notice: Subject to any disclaimer, the term of this patent is extended or adjusted under 35 U.S.C. 154(b) by 315 days.

(21) Appl. No.: 17/684,772

(22) Filed: Mar. 2, 2022

(65) Prior Publication Data

US 2023/0279811 A1  Sep. 7, 2023

(51) Int. Cl.

| F02C 7/18 | (2006.01) |
| F01D 25/12 | (2006.01) |
| F28D 1/04 | (2006.01) |
| F28D 1/053 | (2006.01) |
| F28D 7/06 | (2006.01) |
| F28D 7/16 | (2006.01) |

(52) U.S. Cl.
CPC ............ *F02C 7/185* (2013.01); *F01D 25/125* (2013.01); *F28D 1/0417* (2013.01); *F28D 1/05366* (2013.01); *F28D 7/06* (2013.01); *F28D 7/16* (2013.01); *F05D 2250/312* (2013.01); *F05D 2250/313* (2013.01); *F05D 2260/213* (2013.01); *F05D 2260/2212* (2013.01); *F05D 2260/2214* (2013.01); *F05D 2260/232* (2013.01)

(58) Field of Classification Search
CPC ....... F28D 7/0008; F28D 7/0058; F02C 7/185
See application file for complete search history.

(56) References Cited

U.S. PATENT DOCUMENTS

| 4,542,623 A | 9/1985 | Hovan et al. |
| 9,027,353 B2 | 5/2015 | Glahn et al. |
| 9,038,398 B2 | 5/2015 | Suciu et al. |
| 9,239,005 B2 | 1/2016 | Strecker et al. |
| 9,976,485 B2 | 5/2018 | Suciu et al. |
| 10,209,009 B2 | 2/2019 | Gerstler et al. |
| 10,882,596 B2 | 1/2021 | Cysewski et al. |

(Continued)

FOREIGN PATENT DOCUMENTS

CN  207816059 U  *  9/2018

*Primary Examiner* — Eric S Ruppert
(74) *Attorney, Agent, or Firm* — Dority & Manning, P.A.

(57) ABSTRACT

A heat exchanger is provided. The heat exchanger includes one or more exchanger units that each have a core and manifolds. The core of an exchanger unit is formed by multiple unit cells coupled together in flow communication to create a flow distribution grid. Each unit cell has at a first primary channel, a second primary channel, a first secondary channel in flow communication with the first primary channel, and a second secondary channel in flow communication with the second primary channel. The first secondary channel traverses through the second primary channel and the second secondary channel traverses through the first primary channel. Each manifold includes two chambers for separating fluids flowing through the heat exchanger, with one chamber being in flow communication with one of the primary channels and having one or more tubes traversing therethrough to provide flow communication between the other primary channel and the other chamber.

19 Claims, 9 Drawing Sheets

(56) References Cited

U.S. PATENT DOCUMENTS

| | | |
|---|---|---|
| 2013/0133334 A1* | 5/2013 | Strecker .................. F02C 7/18 60/785 |
| 2016/0202003 A1 | 7/2016 | Gerstler et al. |
| 2020/0103178 A1 | 4/2020 | Gerstler et al. |
| 2020/0363133 A1 | 11/2020 | Gerstler et al. |
| 2021/0102492 A1 | 4/2021 | Rambo et al. |
| 2021/0156339 A1 | 5/2021 | Rathay et al. |
| 2021/0293483 A1 | 9/2021 | Gerstler et al. |

* cited by examiner

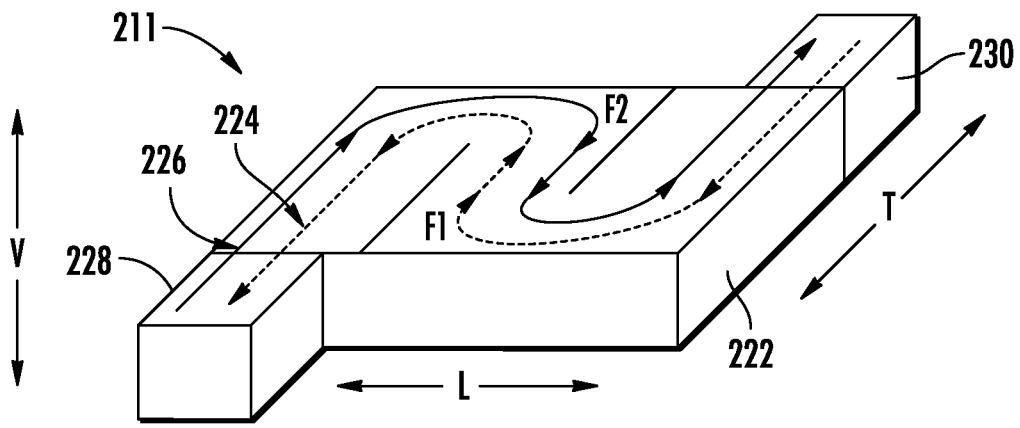
FIG. 3
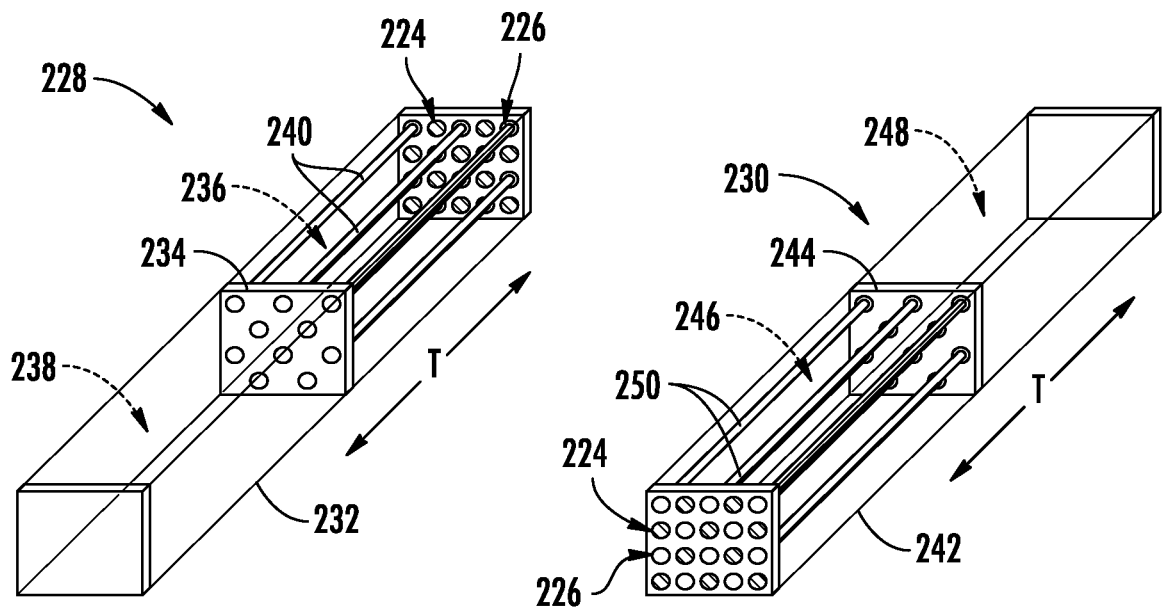
FIG. 4
FIG. 5

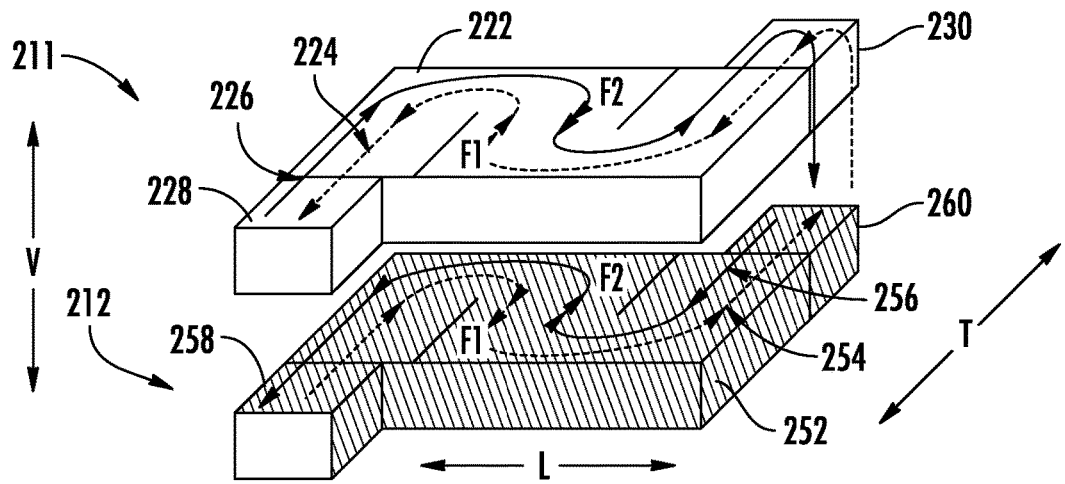
FIG. 8
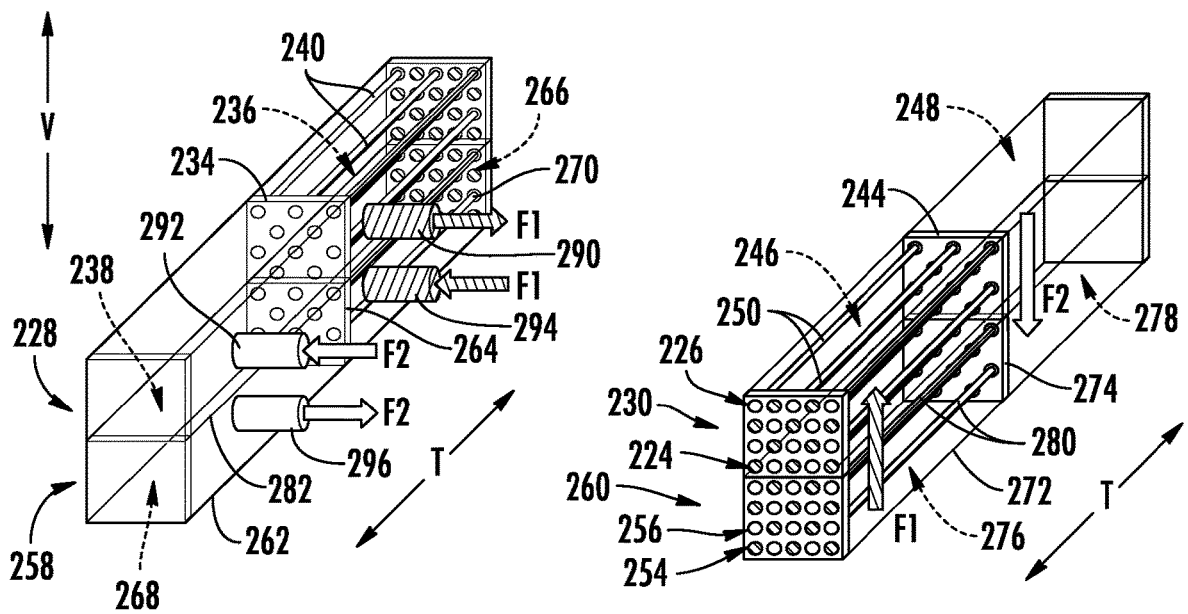
FIG. 9
FIG. 10

HEAT EXCHANGER FOR A GAS TURBINE ENGINE

FIELD

The present disclosure relates to heat exchangers, and more particularly to heat exchangers for gas turbine engines.

BACKGROUND

A gas turbine engine can include one or more heat exchangers. For example, a gas turbine engine can include a buffer air heat exchanger configured to cool relatively warm high pressure air using relatively cool low pressure air. The cooled high pressure air can be used to cool certain components, such as bearings of the gas turbine engine. To compensate for the relatively low heat transfer capability of air, such heat exchangers have conventionally been bulky and heavy.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which:

FIG. 3 provides a perspective view of an exchanger unit of the heat exchanger of FIG. 2;

FIG. 4 provides a perspective view of a first manifold of the exchanger unit of FIG. 3;

FIG. 5 provides a perspective view of a second manifold of the exchanger unit of FIG. 3;

FIG. 8 provides a perspective view of the exchanger unit of the heat exchanger of FIG. 2 paired with another exchanger unit to form an exchanger pair;

FIG. 9 provides a perspective view of the interaction between two manifolds of the exchanger units of the exchanger pair of FIG. 8;

FIG. 10 provides a perspective view of the interaction between two other manifolds of the exchanger units of the exchanger pair of FIG. 8;

DETAILED DESCRIPTION

Figure 1:
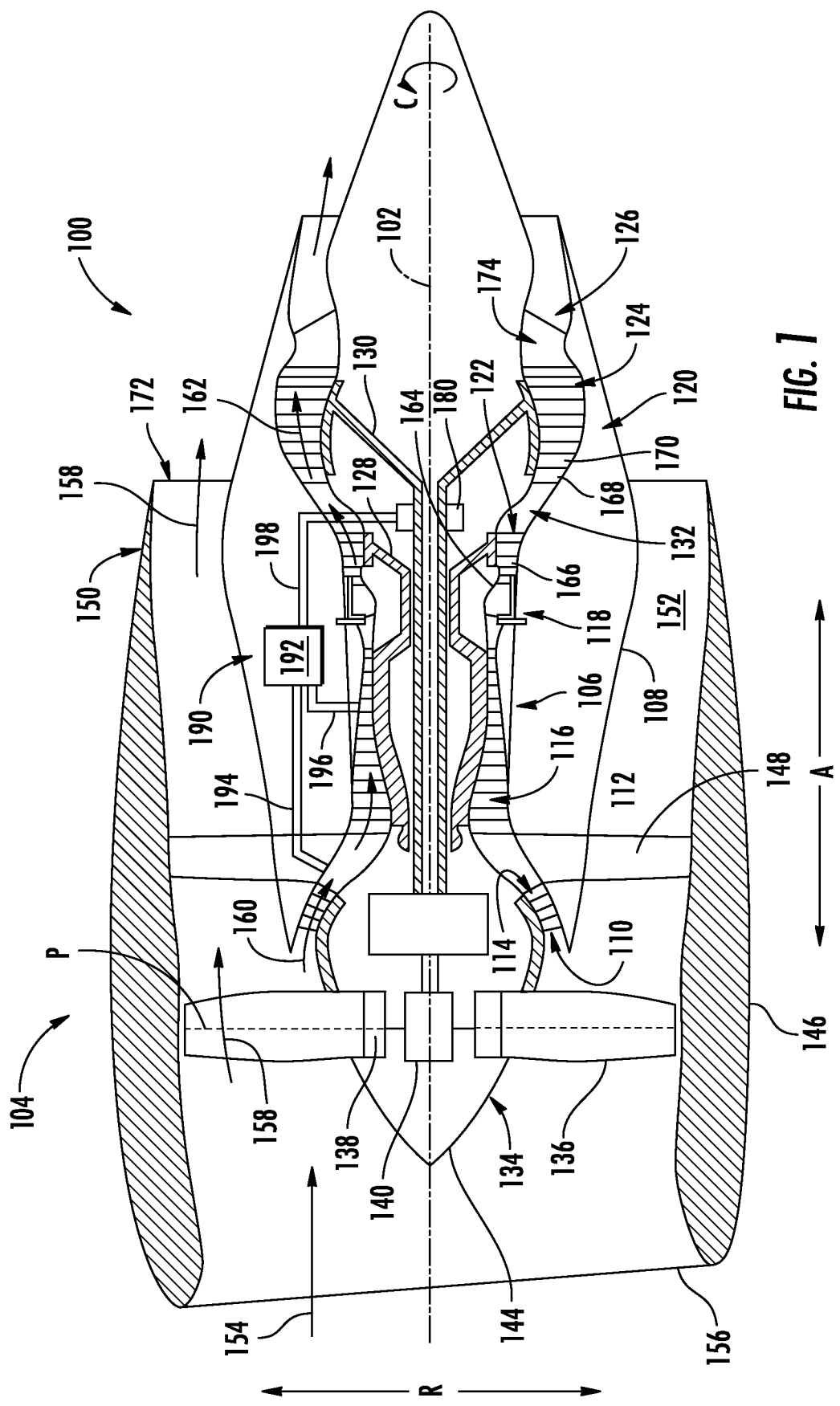
FIG. 1 provides a schematic cross-sectional view of a gas turbine engine in accordance with an example embodiment of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

As used herein, the terms "first", "second", and "third" may be used interchangeably to distinguish one component from another and are not intended to signify location or importance of the individual components.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

The term "at least one of" in the context of, e.g., "at least one of A, B, and C" refers only A, only B, only C, or any combination of A, B, and C.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin. These approximating margins may apply to a single value, either or both endpoints defining numerical ranges, and/or the margin for ranges between endpoints.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Some gas turbine engines can include one or more heat exchangers. For instance, a gas turbine engine can include a buffer air heat exchanger configured to cool relatively warm high pressure air using relatively cool low pressure air. For example, a gas turbine engine can include a buffer air heat exchanger configured to cool relatively warm high pressure air drawn from a high pressure compressor using relatively cool low pressure air discharged from a low pressure compressor. The cooled high pressure air can be used to cool certain components, such as bearings of the gas turbine engine. To compensate for the relatively low heat transfer capability of air, such heat exchangers have conventionally been bulky and heavy. The weight and space occupied by a heat exchanger in a gas turbine engine are of importance as space is limited and the weight of a heat exchanger directly impacts the efficiency of the gas turbine engine and aircraft to which it is mounted.

In accordance with the inventive aspects of the present disclosure, a heat exchanger for a turbine engine is provided. The arrangement and construction of the heat exchanger may enable the heat exchanger to be compact and highly efficient. In one example aspect, a heat exchanger includes a plurality of exchanger units. Each exchanger unit has a core and two manifolds. The exchanger units can be stacked and coupled together in flow communication to form exchanger pairs.

The core of an exchanger unit is formed by multiple unit cells coupled together in flow communication with one another to create a flow distribution grid. The unit cells are arranged to enable a large heat transfer area, and can be assembled to conform with any flow path. The unit cells can define first channels configured to receive a first fluid and second channels configured to receive a second fluid. The channels enable multiple flow branches with localized turbulence to enhance heat transfer.

Particularly, each unit cell can have two parallel primary channels that are perpendicular to two secondary channels. The two secondary channels can be parallel to one another. The two primary channels are also optionally perpendicular to tertiary channels. The tertiary channels are parallel to one another and are also perpendicular to the secondary channels. The primary channels allow for both fluid sides to flow in counterflow direction. The secondary channels/tertiary channels allow for both fluid sides to flow in counterflow and/or crossflow direction with each other and in crossflow direction with the primary channels.

On two diagonally-opposite sides of a unit cell, the secondary/tertiary channels allow for either single or double (t-shaped) crossflow arrangements that are perpendicular to the primary channel flow. On the other two diagonally-opposite sides of the unit cell, the primary channel and the secondary/tertiary channels extending from a junction with the primary channel allow for either trifurcating flow arrangements (when no tertiary channels are present) or pentafurcating flow arrangements (when the tertiary channels are present). The counterflows, crossflows, and trifurcating and/or pentafurcating flow arrangements enable localized turbulence and a large heat transfer surface area, thereby enabling efficient heat transfer.

The manifolds enable compact arrangement of multiple exchanger units. Particularly, the manifolds enable the flow inlet and outlet of the two fluid sides to flow in either a countercurrent or co-current flow direction. Each manifold includes two compartments or chambers—one for each fluid side. In the chamber nearest to the core, the primary channels for one fluid side extend out from the core as a plurality of tubes, while the primary channel for the other fluid side terminates at the core edge. The ends of the tubes (extended primary channels) connect to a partition wall, which acts as a barrier between the two chambers. This arrangement allows for both fluid sides to be separated into distinct chambers. A manifold of one exchanger unit may be arranged in flow communication with a manifold of another exchanger unit to form an exchanger pair, thereby facilitating compact arrangement of the exchanger units of the heat exchanger.

Referring now to the drawings, FIG. 1 provides a schematic cross-sectional view of a gas turbine engine 100 according to an example embodiment of the present disclosure. For the depicted embodiment of FIG. 1, the gas turbine engine 100 is an aeronautical, high-bypass turbofan jet engine configured to be mounted to an aircraft, e.g., in an under-wing configuration. As shown, the gas turbine engine 100 defines an axial direction A, a radial direction R, and a circumferential direction C. The axial direction A extends parallel to or coaxial with a longitudinal centerline 102 defined by the gas turbine engine 100.

The gas turbine engine 100 includes a fan section 104 and a core turbine engine 106 disposed downstream of the fan section 104. The core turbine engine 106 includes an engine cowl 108 that defines an annular core inlet 110. The engine cowl 108 encases, in a serial flow relationship, a compressor section 112 including a first, booster or LP compressor 114 and a second, HP compressor 116; a combustion section 118; a turbine section 120 including a first, HP turbine 122 and a second, LP turbine 124; and an exhaust section 126. Thus, the compressor section 112, combustion section 118, turbine section 120, and the exhaust section 126 are in a serial flow arrangement. An HP shaft 128 drivingly connects the HP turbine 122 to the HP compressor 116. An LP shaft 130 drivingly connects the LP turbine 124 to the LP compressor 114. The compressor section 112, combustion section 118, turbine section 120, and exhaust section 126 together define a core air flowpath 132 through the core turbine engine 106.

The fan section 104 includes a fan 134 having a plurality of fan blades 136 coupled to a disk 138 in a circumferentially spaced apart manner. As depicted, the fan blades 136 extend outward from the disk 138 generally along the radial direction R. Each fan blade 136 is rotatable relative to the disk 138 about a pitch axis P by virtue of the fan blades 136 being operatively coupled to a suitable actuation member 140 configured to collectively vary the pitch of the fan blades 136, e.g., in unison. The fan blades 136, disk 138, and actuation member 140 are together rotatable about the longitudinal centerline 102 by the LP shaft 130 across a power gearbox 142. The power gearbox 142 includes a plurality of gears for stepping down the rotational speed of the LP shaft 130 to affect a more efficient rotational fan speed. In other embodiments, the fan blades 136, disk 138, and actuation member 140 can be directly connected to the LP shaft 130, e.g., in a direct-drive configuration. Further, in other embodiments, the fan blades 136 of the fan 134 can be fixed-pitch fan blades.

Referring still to FIG. 1, the disk 138 is covered by a rotatable spinner 144 aerodynamically contoured to promote an airflow through the plurality of fan blades 136. Additionally, the fan section 104 includes an annular fan casing or outer nacelle 146 that circumferentially surrounds the fan 134 and/or at least a portion of the core turbine engine 106. The nacelle 146 is supported relative to the core turbine engine 106 by a plurality of circumferentially-spaced outlet guide vanes 148. A downstream section 150 of the nacelle 146 extends over an outer portion of the core turbine engine 106 so as to define a bypass airflow passage 152 therebetween.

During operation of the gas turbine engine 100, a volume of air 154 enters the gas turbine engine 100 through an associated inlet 156 of the nacelle 146 and/or fan section 104. As the volume of air 154 passes across the fan blades 136, a first portion of the air indicated by arrows 158 is directed or routed into the bypass airflow passage 152 and a second portion indicated by arrow 160 is directed or routed into the core inlet 110 and into the LP compressor 114. The pressure of the second portion of air 160 is increased as it is routed through the LP compressor 114 and the HP compressor 116. The compressed second portion of air 160 is then discharged into the combustion section 118.

The compressed second portion of air 160 from the compressor section 112 mixes with fuel and is burned within a combustor of the combustion section 118 to provide combustion gases 162. The combustion gases 162 are routed from the combustion section 118 along a hot gas path 174 of the core air flowpath 132 through the HP turbine 122 where a portion of thermal and/or kinetic energy from the combustion gases 162 is extracted via sequential stages of HP turbine stator vanes 164 and HP turbine blades 166. The HP turbine blades 166 are mechanically coupled to the HP shaft 128. Thus, when the HP turbine blades 166 extract energy from the combustion gases 162, the HP shaft 128 rotates, thereby supporting operation of the HP compressor 116. The combustion gases 162 are routed through the LP turbine 124 where a second portion of thermal and kinetic energy is extracted from the combustion gases 162 via sequential stages of LP turbine stator vanes 168 and LP turbine blades 170. The LP turbine blades 170 are coupled to the LP shaft 130. Thus, when the LP turbine blades 170 extract energy from the combustion gases 162, the LP shaft 130 rotates, thereby supporting operation of the LP compressor 114 and the fan 134.

The combustion gases 162 are subsequently routed through the exhaust section 126 of the core turbine engine 106 to provide propulsive thrust. Simultaneously, the pressure of the first portion of air 158 is substantially increased as the first portion of air 158 is routed through the bypass airflow passage 152 before it is exhausted from a fan nozzle exhaust section 172 of the gas turbine engine 100, also providing propulsive thrust. The HP turbine 122, the LP turbine 124, and the exhaust section 126 at least partially define the hot gas path 174 for routing the combustion gases 162 through the core turbine engine 106.

As further shown in FIG. 1, the gas turbine engine 100 includes a cooling system 190 for cooling various components, such as a bearing 180. The cooling system 190 includes one or more heat exchangers, such as heat exchanger 192. The heat exchanger 192 can be a Buffer Air Heat Exchanger (BAHE), for example. For this embodiment, the heat exchanger 192 is configured to receive low pressure compressor discharge bleed air to cool air bled from the HP compressor 116 before the cooled HP compressor air is delivered to cool the bearing 180 and optionally other components as well. The low pressure compressor discharge bleed air can be bled from the core air flowpath 132 and routed to the heat exchanger 192 via a first delivery conduit 194. Bleed air from the HP compressor 116 can be routed to the heat exchanger 192 via as second delivery conduit 196. After being cooled by the low pressure compressor discharge bleed air at the heat exchanger 192, the cooled bleed air from the HP compressor 116 can be routed to the bearing 180 via a third delivery conduit 198. Although not shown, the low pressure compressor discharge bleed air can be routed from the heat exchanger 192 to any suitable location, such as to a core compartment, back to the core air flowpath 132, to another heat exchanger, or to another suitable location. A compact, highly efficient heat exchanger that may be implemented as a BAHE is provided herein.

Further, it will be appreciated that the gas turbine engine 100 depicted in FIG. 1 is provided by way of example only, and that in other example embodiments, the gas turbine engine 100 may have any other suitable configuration. Additionally, or alternatively, aspects of the present disclosure may be utilized with any other suitable aeronautical gas turbine engine, such as a turboshaft engine, turboprop engine, turbojet engine, etc. Further, aspects of the present disclosure may further be utilized with any other land-based gas turbine engine, such as a power generation gas turbine engine, or any aeroderivative gas turbine engine, such as a nautical gas turbine engine. Moreover, the inventive aspects disclosed herein are not limited to turbine engines; rather, the inventive aspects are applicable to any suitable application in which a heat exchanger is implemented. In this regard, the inventive aspects of the present disclosure are applicable to many industries, including the aviation industry, oil and gas industry, automotive industry, power generation industry, the food and beverage industry, and the pharmaceutical industry, among other industries and applications.

Figure 2:
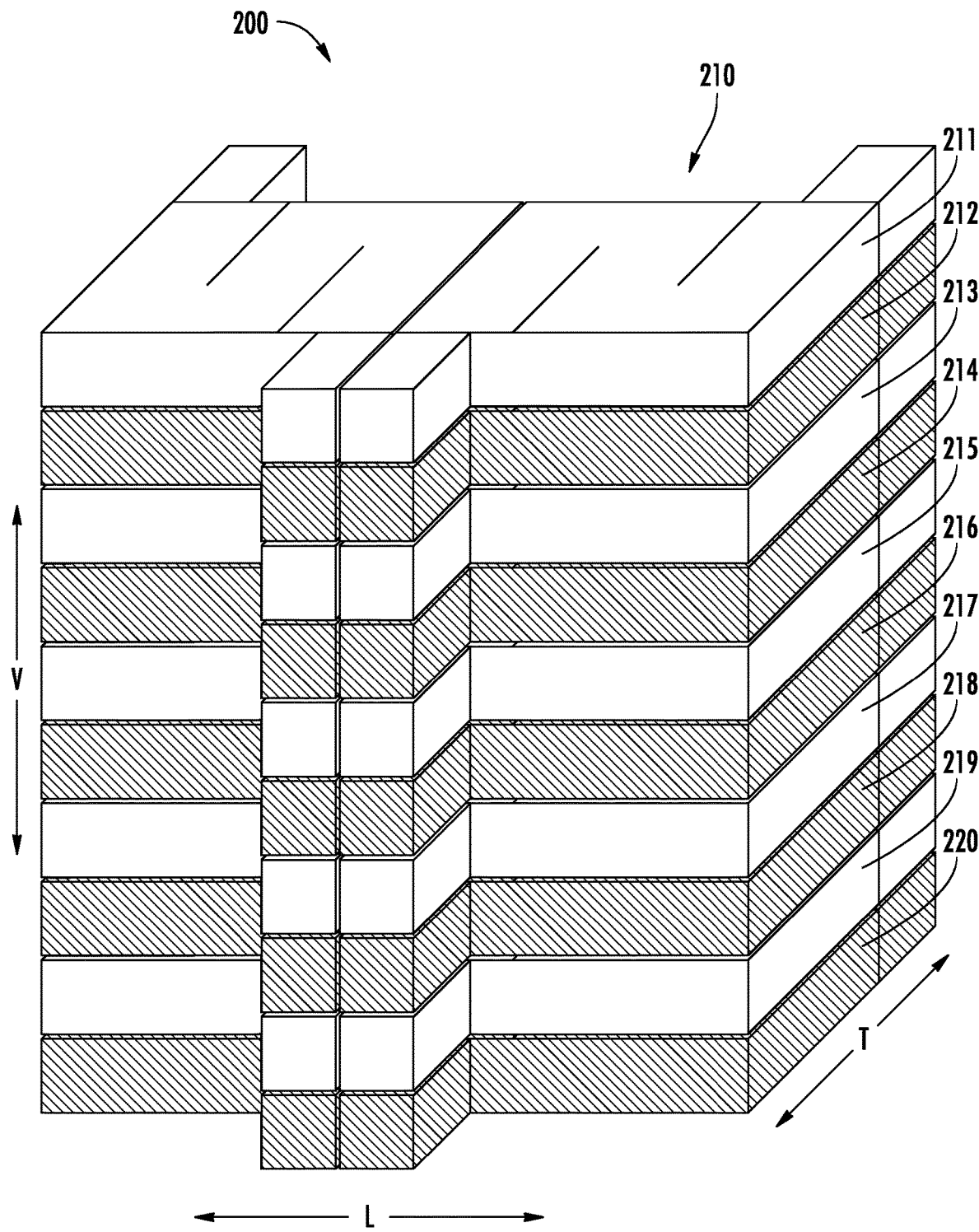
FIG. 2 provides a perspective view of a heat exchanger in accordance with an example embodiment of the present disclosure.

FIG. 2 provides a perspective view of a heat exchanger 200 in accordance with an example embodiment of the present disclosure. The heat exchanger 200 can be implemented as the BAHE provided in FIG. 1, for example. As depicted, the heat exchanger 200 defines a vertical direction V, a lateral direction L, and a transverse direction T that are orthogonal to one another. The heat exchanger 200 includes a plurality of exchanger units 210. The exchanger units 210 can be compactly arranged in any suitable configuration. For this embodiment, the heat exchanger 200 includes twenty (20) exchanger units 210, including ten right-side exchanger units stacked on top of one another along the vertical direction V and ten left-side exchanger units stacked on top of one another along the vertical direction V. Although the heat exchanger 200 of FIG. 2 has twenty exchanger units 210, in other example embodiments, the heat exchanger 200 can include any suitable number of exchanger units, such as one exchanger unit, eight exchanger units, fifty exchanger units, etc. Further, in other embodiments, the exchanger units 210 can be positioned side-by-side rather than stacked on one another.

With reference now to FIGS. 2, 3, 4, and 5, FIG. 3 provides a perspective view of a first exchanger unit 211 of the heat exchanger 200 of FIG. 2. FIG. 4 provides a perspective view of a first manifold 228 of the first exchanger unit 211 and FIG. 5 provides a perspective view of a second manifold 230 of the first exchanger unit 211. Generally, each exchanger unit 210 of the heat exchanger 200 has a core and two manifolds.

Particularly, as depicted, the first exchanger unit 211 includes a core 222 defining first channels 224 and second channels 226. The first channels 224 can receive a first fluid F1 and the second channels 226 can receive a second fluid F2. The first fluid F1 and the second fluid F2 can both be air, for example. In this regard, the heat exchanger 200 can be an air-to-air heat exchanger. The first fluid F1 flowing through the first channels 224 can be both warmer and at a higher pressure than the second fluid F2 flowing through the second channels 226, or vice versa. In this way, thermal energy can be exchanged between the first and second fluids F1, F2 as they flow through the first exchanger unit 211.

Figure 6:
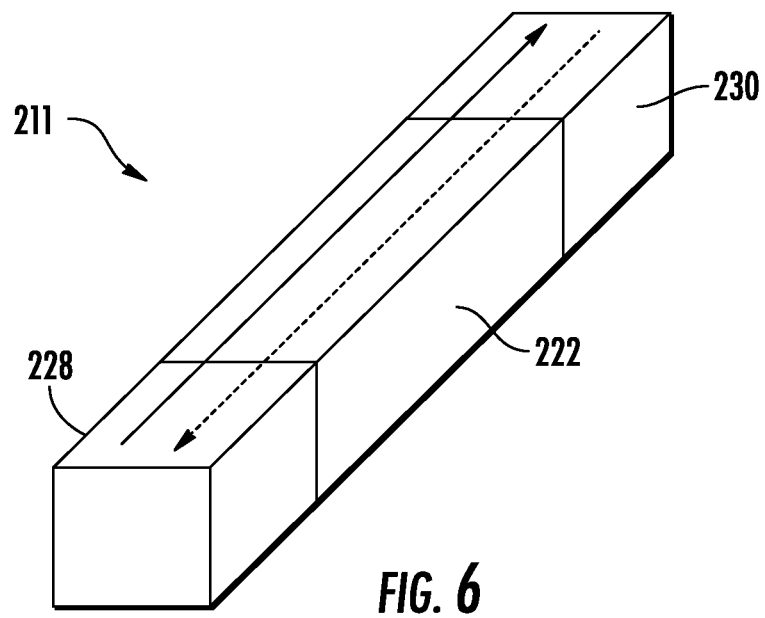
FIG. 6 provides a perspective view of an exchanger unit of a heat exchanger in accordance with another example embodiment of the present disclosure.
Figure 7:
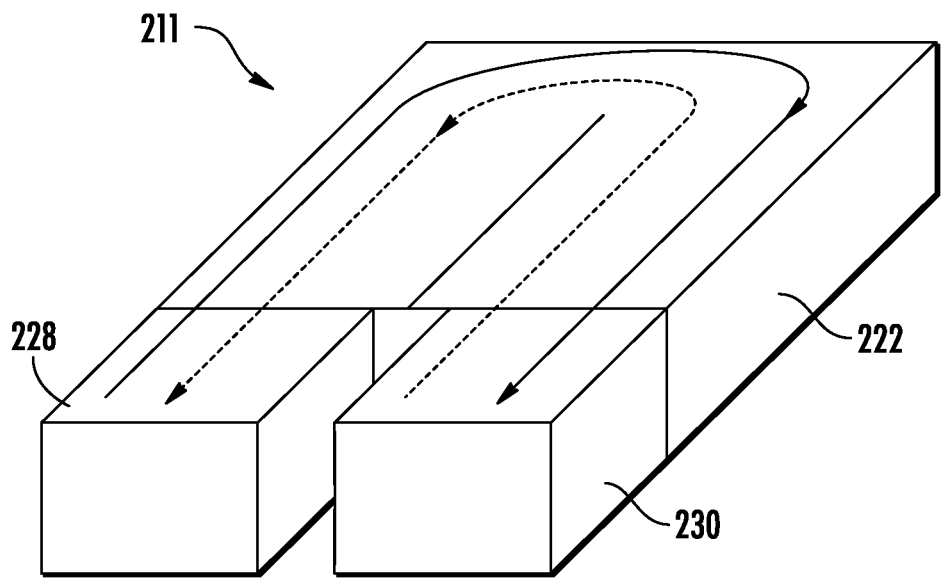
FIG. 7 provides a perspective view of an exchanger unit of a heat exchanger in accordance with yet another example embodiment of the present disclosure.

Although the core 222 of the first exchanger unit 211 is shown in a double U-bend channel configuration, it will be appreciated that the core 222 of the first exchanger unit 211 (as well as the cores of the other exchanger units 210) can have other suitable configurations such as a straight channel configuration shown in FIG. 6 or the single U-bend channel configuration shown in FIG. 7. The core 222 of the first exchanger unit 211, or more generally, the core of an exchanger unit will be described in greater detail later in the disclosure.

The first exchanger unit 211 includes the first manifold 228 and the second manifold 230, as noted. For this embodiment, the first manifold 228 is arranged to distribute the second fluid F2 into the core 222 and to receive the first fluid F1 flowing out of the core 222. In contrast, the second manifold 230 is arranged to distribute the first fluid F1 into the core 222 and to receive the second fluid F2 flowing out the core 222.

The first manifold 228 has a housing 232 and a partition wall 234 that together define two chambers, including a first chamber 236 and a second chamber 238. The housing 232 is shown transparent in FIG. 4 for illustrative purposes. The first chamber 236 and the second chamber 238 are separated by the partition wall 234, e.g., along the transverse direction T. In this regard, the first chamber 236 and the second chamber 238 of the first manifold 228 are fluidly isolated from one another. The first chamber 236 is in flow communication with the first channels 224 of the core 222. In this way, the first fluid F1 can flow out of the core 222 into the first chamber 236, or vice versa in other embodiments.

The first manifold 228 also includes a plurality of tubes 240 that extend through the first chamber 236 and the partition wall 234 to provide flow communication between the second chamber 238 and the second channels 226. In this way, the second fluid F2 can flow from the second chamber 238, through the tubes 240 extending through the first chamber 236, and into the second channels 226, or vice versa in other embodiments. The partition wall 234 can define one or more apertures to receive the tubes 240 as shown in FIG. 4.

The second manifold 230 has a housing 242 and a partition wall 244 that together define two chambers, including a first chamber 246 and a second chamber 248. The housing 242 is shown transparent in FIG. 5 for illustrative purposes. The first chamber 246 and the second chamber 248 are separated by the partition wall 244, e.g., along the transverse direction T. In this manner, the first chamber 246 and the second chamber 248 of the second manifold 230 are fluidly isolated from one another. The first chamber 246 is in flow communication with the first channels 224 of the core 222. In this way, the first fluid F1 can flow from the first chamber 246 into the core 222, or vice versa in other embodiments.

The second manifold 230 also includes a plurality of tubes 250 that extend through the first chamber 246 and the partition wall 244 to provide flow communication between the second chamber 248 and the second channels 226. In this way, the second fluid F2 can flow from the second channels 226 of the core 222, through the tubes 250 extending through the first chamber 246, and into the second chamber 248, or vice versa in other embodiments.

Referring now to FIGS. 2, 8, 9, and 10, FIG. 8 provides an exploded, perspective view of the first exchanger unit 211 paired with a second exchanger unit 212. The second exchanger unit 212 is arranged to form an exchanger pair with the first exchanger unit 211. FIG. 9 provides a perspective view of an interaction between two of the manifolds of the exchanger units 211, 212 of the exchanger pair of FIG. 8. FIG. 10 provides a perspective view of an interaction between the two other manifolds of the exchanger units 211, 212 of the exchanger pair of FIG. 8.

Generally, the second exchanger unit 212 is configured in a similar manner as the first exchanger unit 211. The second exchanger unit 212 includes a core 252 defining first channels 254 and second channels 256. The first channels 254 are configured to receive the first fluid F1 while the second channels 256 are configured to receive the second fluid F2. The second exchanger unit 212 also includes a first manifold 258 and a second manifold 260.

The first manifold 258 of the second exchanger unit 212 has a housing 262 and a partition wall 264 that together define a third chamber 266 and a fourth chamber 268. The third chamber 266 and the fourth chamber 268 are separated by the partition wall 264. The third chamber 266 is in flow communication with the first channels 254 of the core 252 of the second exchanger unit 212. The first manifold 258 of the second exchanger unit 212 includes a plurality of tubes 270 that extend through the third chamber 266 and the partition wall 264 of the second exchanger unit 212 to provide flow communication between the fourth chamber 268 and the second channels 256 of the core 252 of the second exchanger unit 212. Notably, the third chamber 266 is not in flow communication with the first chamber 236, and the fourth chamber 268 is not in flow communication with the second chamber 238. For instance, for this embodiment, a chamber wall 282 separates the first chamber 236 and the third chamber 266 and separates the second chamber 238 and the fourth chamber 268, e.g., along the vertical direction V.

As shown in FIG. 9, the first exchanger unit 211, or rather the first manifold 228 thereof, has a first port 290 allowing for flow communication into or out of the first chamber 236 and a second port 292 allowing for flow communication into or out of the second chamber 238. For this embodiment, for example, the first fluid F1 can flow out of the first chamber 236 through the first port 290 and the second fluid F2 can flow into the second chamber 238 through the second port 292. Similarly, the second exchanger unit 212, or rather the first manifold 258 thereof, has a third port 294 allowing for flow communication into or out of the third chamber 266 and a fourth port 296 allowing for flow communication into or out of the fourth chamber 268. For this embodiment, the first fluid F1 can flow out of the third chamber 266 through the third port 294 and the second fluid F2 can flow into the fourth chamber 268 through the fourth port 296.

As shown in FIG. 10, the second manifold 260 of the second exchanger unit 212 has a housing 272 and a partition wall 274 that together define a third chamber 276 and a fourth chamber 278. The third chamber 276 and the fourth chamber 278 are separated by the partition wall 274. The third chamber 276 is in flow communication with the first channels 254 of the core 252 of the second exchanger unit 212. The second manifold 260 of the second exchanger unit 212 includes a plurality of tubes 280 that extend through the third chamber 276 and the partition wall 274 of the second exchanger unit 212 to provide flow communication between the fourth chamber 278 and the second channels 256 of the core 252 of the second exchanger unit 212.

Generally, the first fluid F1 flows through the core 252 of the second exchanger unit 212 in a direction opposite in which the first fluid F1 flows through the core 222 of the first exchanger unit 211. Similarly, the second fluid F2 flows through the core 252 of the second exchanger unit 212 in a direction opposite in which the second fluid F2 flows through the core 222 of the first exchanger unit 211. Such flows are enabled, at least in part, by the arrangement of the second manifold 230 of the first exchanger unit 211 and the second manifold 260 of the second exchanger unit 212.

Particularly, as shown in FIG. 10, the third chamber 276 is in flow communication with the first chamber 246. In this regard, the third chamber 276 and the first chamber 246 collectively form an exchanger pair chamber that allows the first fluid F1 to flow between the second exchanger unit 212 and the first exchanger unit 211. Specifically, the first fluid F1 can flow out of the first channels 254 of the core 252 of the second exchanger unit 212 into the third chamber 276, and then may flow from the third chamber 276 into the first chamber 246, and ultimately into the first channels 224 of the first exchanger unit 211.

Also, as depicted in FIG. 10, the fourth chamber 278 is in flow communication with the second chamber 248. In this regard, the fourth chamber 278 and the second chamber 248 collectively form an exchanger pair chamber that allows the second fluid F2 to flow between the first exchanger unit 211 and the second exchanger unit 212. Accordingly, the second fluid F2 can flow out of the second channels 226 of the core 222 of the first exchanger unit 211 into the tubes 250 across the first chamber 246 and into the second chamber 248, and then may flow from the second chamber 248 into the fourth chamber 278, and thereafter, the second fluid F2 can flow from the fourth chamber 278 into the tubes 280 across the third chamber 276, and ultimately into the second channels 256 of the core 252 of the second exchanger unit 212.

The other exchanger units of the heat exchanger 200 can form exchanger pairs with one another in the same manner as the first and second exchanger units 211, 212 form an exchanger pair. For instance, with reference to FIG. 2, the third and fourth exchanger units 213, 214 can form an exchanger pair, the fifth and sixth exchanger units 215, 216 can form an exchanger pair, the seventh and eighth exchanger units 217, 218 can form an exchanger pair, and the ninth and tenth exchanger units 219, 220 can form an exchanger pair. The exchanger units 210 on the left side of the heat exchanger 200 can likewise form exchanger pairs.

Figure 11:
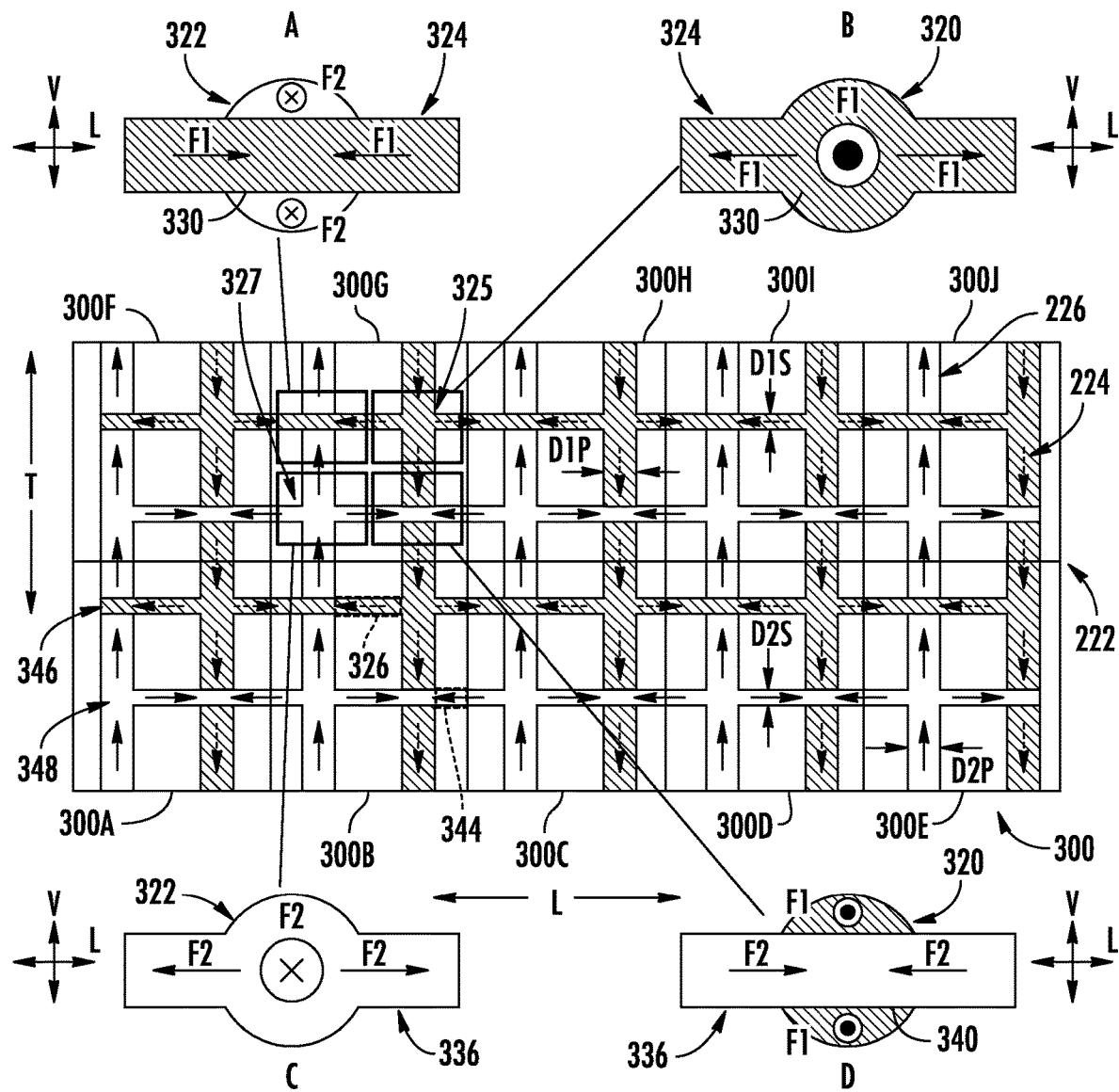
FIG. 11 provides a schematic cross-sectional view of a portion of a core of one exchanger unit of FIG. 8.
Figure 12:
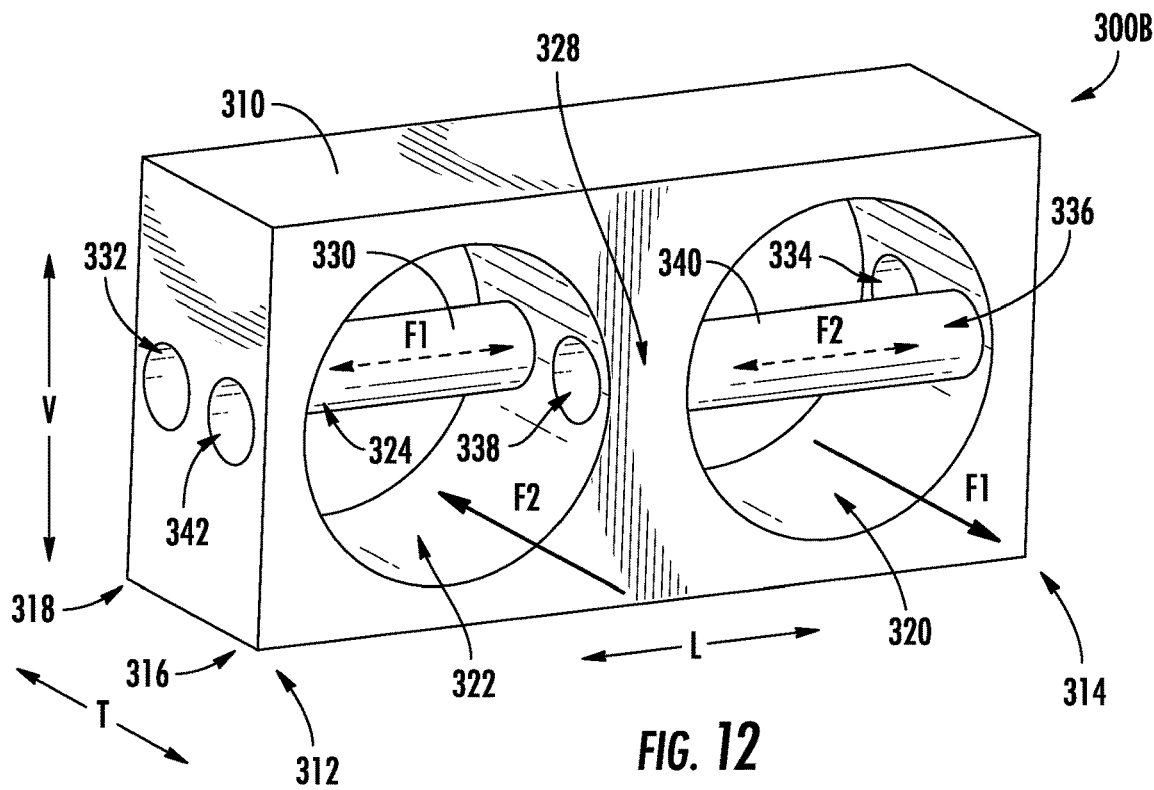
FIG. 12 provides a perspective view of one unit cell of the core of FIG. 11.
Figure 13:
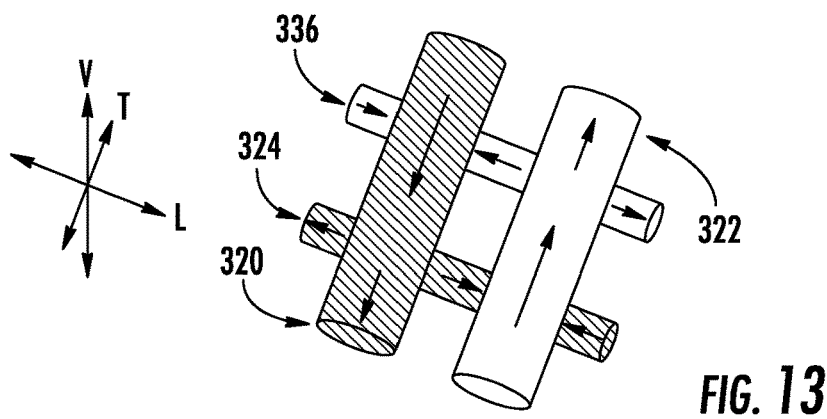
FIG. 13 provides a perspective view of the flow distribution of the unit cell of FIG. 12.
Figure 14:
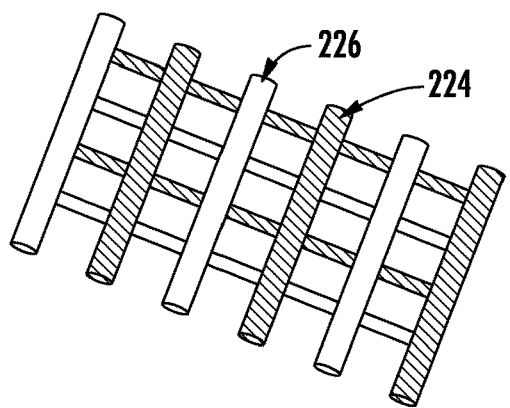
FIG. 14 provides a perspective view of the first and second channels of the core of FIG. 11.

With reference now to FIGS. 2, 11, 12, 13, and 14, the core of an exchanger unit of the heat exchanger 200 will now be described in further detail. FIG. 11 provides a schematic cross-sectional view of a portion of the core 222 of the first exchanger unit 211. FIG. 12 provides a perspective view of one unit cell of the core 222 of FIG. 11. FIG. 13 provides a perspective view of the flow distribution of the unit cell of FIG. 12. FIG. 14 provides a perspective view of the first channels 224 and the second channels 226 of the core 222. Although the core 222 of the first exchanger unit 211 is described, it will be appreciated that the core of each exchanger unit 210 of the heat exchanger 200 can be constructed as provided below.

As depicted, the core 222 has a plurality of unit cells 300 coupled together in flow communication to define a flow distribution grid of the first exchanger unit 211. The unit cells 300 can be arranged to conform to the shape of the desired flow path with any suitable number of bends, e.g., a double U-bend channel configuration as shown in FIG. 3, a straight channel configuration as shown in FIG. 6, a single U-bend channel configuration as shown in FIG. 7, etc. The unit cells 300 of the portion of the core 222 are individually labeled in FIG. 11 as 300A through 300J.

Generally, each unit cell 300 includes a cell block that defines a first primary channel, a second primary channel, a first secondary channel in flow communication with the first primary channel, and a second secondary channel in flow communication with the second primary channel. The first secondary channel traverses through the second primary channel and the second secondary channel traverses through the first primary channel. In some embodiments, the first primary channel and the second primary channel are arranged parallel to one another and the first secondary channel and the second secondary channel are arranged perpendicular to the first primary channel and the second primary channel.

In some embodiments, the secondary channels can extend lengthwise in a plane in which the primary channels also extend lengthwise. For instance, the secondary channels and the primary channels can both extend lengthwise in a horizontal plane that is perpendicular to the vertical direction V. For example, the primary channels can extend lengthwise along the transverse direction T and the secondary channels can extend lengthwise along the lateral direction L. In other embodiments, the secondary channels can extend lengthwise in a different plane than the primary channels. For instance, the primary channels can extend lengthwise in a horizontal plane that is perpendicular to the vertical direction V and the secondary channels can extend lengthwise in a vertical plane. For example, the primary channels can extend lengthwise along the transverse direction T (or lateral direction L) and the secondary channels can extend lengthwise along the vertical direction V.

The first primary channel of a given unit cell is in flow communication with a first primary channel of an adjacent unit cell, a second primary channel of a given unit cell is in flow communication with a second primary channel of an adjacent unit cell, a first secondary channel of a given unit cell is in flow communication with the first primary channel of the given unit cell and is also in flow communication with a first secondary channel of an adjacent unit cell, and a second secondary channel of a given unit cell is in flow communication with the second primary channel of the given unit cell and also in flow communication with a second secondary channel of an adjacent unit cell. The first primary channels and the first secondary channels of the plurality of unit cells 300 collectively form the first channels 224 of the core 222 and the second primary channels and the second secondary channels of the plurality of unit cells 300 collectively form the second channels of the core 222.

By way of example, the unit cell 300B of the core 222 is depicted in FIG. 12. The unit cell 300B includes a cell block 310. The cell block 310 can be formed of any suitable material. The cell block 310 extends between a first side 312 and a second side 314, e.g., along the lateral direction L, and between a front 316 and a back 318, e.g., along the transverse direction T. The cell block 310 defines a first primary channel 320 configured to receive the first fluid F1. The first primary channel 320 has a diameter D1P (see unit cell 300H in FIG. 11) and spans between the front 316 and the back 318 of the unit cell 300B along the transverse direction T. The cell block 310 also defines a second primary channel 322 configured to receive the second fluid F2. The second primary channel 322 has a diameter D2P (see unit cell 300E in FIG. 11) and spans between the front 316 and the back 318 of the unit cell 300B along the transverse direction T. The first primary channel 320 and the second primary channel 322 are arranged parallel to one another in this embodiment.

The cell block 310 further defines a first secondary channel 324 configured to receive the first fluid F1. The first secondary channel 324 has a diameter D1S (see unit cell 300I in FIG. 11) and spans between the first side 312 and the second side 314 of the unit cell 300B along the lateral direction L. The first secondary channel 324 is in flow communication with the first primary channel 320. Specifically, the cell block 310 defines a first bridge aperture 326 (FIG. 11) through a bridge 328 of the cell block 310. The first bridge aperture 326 provides flow communication between the first primary channel 320 and a first conduit 330 of the cell block 310 that spans the second primary channel 322. In this regard, the first secondary channel 324 traverses through the second primary channel 322. The first conduit 330 is in flow communication with a first side aperture 332 defined by a first side portion of the cell block 310. A second side portion of the cell block 310 defines a second side aperture 334 that is in flow communication with the first primary channel 320. The first secondary channel 324 is collectively formed by the first side aperture 332, the first conduit 330, the first bridge aperture 326 (FIG. 11), and the second side aperture 334. The first secondary channel 324 is arranged perpendicular to both the first primary channel 320 and the second primary channel 322.

For this embodiment, the first secondary channel 324 is not only arranged perpendicular to both the first primary channel 320 and the second primary channel 322, but the first secondary channel 324 also extends lengthwise in a same plane as the first and second primary channels 320, 322. Particularly, for this embodiment, the first secondary channel 324 extends lengthwise in a horizontal plane perpendicular to the vertical direction V as does the first and second primary channels 320, 322. In other embodiments, however, the first secondary channel 324 can be arranged perpendicular to both the first and second primary channels 320, 322 and may extend lengthwise in a different plane than the first and second primary channels 320, 322 extend lengthwise. As one example, the first secondary channel 324 can extend lengthwise in a vertical plane along the vertical direction V and the first primary channel 320 and the second primary channel 322 can both extend lengthwise in a horizontal plane perpendicular to the vertical direction V.

The cell block 310 also defines a second secondary channel 336 configured to receive the second fluid F2. The second secondary channel 336 has a diameter D2S (see unit cell 300D in FIG. 11) and spans between the first side 312 and the second side 314 of the unit cell 300B along the lateral direction L. The second secondary channel 336 is in flow communication with the second primary channel 322. Specifically, the cell block 310 defines a second bridge aperture 338 through the bridge 328 of the cell block 310. The second bridge aperture 338 provides flow communication between the second primary channel 322 and a second conduit 340 of the cell block 310 that spans the first primary channel 320. In this regard, the second secondary channel 336 traverses through the first primary channel 320. A first side portion of the cell block 310 defines a first side aperture 342 that is in flow communication with the second primary channel 322. The second conduit 340 is in flow communication with the second bridge aperture 338 and a second side aperture 344 (FIG. 11) defined by the second side portion of the cell block 310. The second secondary channel 336 is collectively formed by the first side aperture 342, the second bridge aperture 338, the second conduit 340, and the second side aperture 344. The second secondary channel 336 is arranged perpendicular to both the first primary channel 320 and the second primary channel 322.

For this embodiment, the second secondary channel 336 is not only arranged perpendicular to both the first primary channel 320 and the second primary channel 322, but the second secondary channel 336 also extends lengthwise in a same plane as the first and second primary channels 320, 322. Particularly, for this embodiment, the second secondary channel 336 extends lengthwise in a horizontal plane perpendicular to the vertical direction V as does the first and second primary channels 320, 322. In other embodiments, however, the second secondary channel 336 can be arranged perpendicular to both the first and second primary channels 320, 322 and may extend lengthwise in a different plane than the first and second primary channels 320, 322 extend lengthwise. As one example, the second secondary channel 336 can extend lengthwise in a vertical plane along the vertical direction V and the first primary channel 320 and the second primary channel 322 can both extend lengthwise in a horizontal plane perpendicular to the vertical direction V.

The diameters D1P, D2P of the first primary channel 320 and the second primary channel 322 are both greater than the diameters D1S, D2S of the first secondary channel 324 and the second secondary channel 336. For instance, in some embodiments, the diameter D1P of the first primary channel 320 and the diameter D2P of the second primary channel D2P are both at least twice as great as the diameter D1S of the first secondary channel 324 and both twice as great as the diameter D2S of the second secondary channel 336. In some embodiments, the diameter D1P of the first primary channel 320 and the diameter D2P of the second primary channel 322 are both at least twice as great and less than or equal to four times the diameter D1S of the first secondary channel 324 and twice as great and less than or equal to four times the diameter D2S of the second secondary channel 336. In yet other embodiments, the diameter D1P of the first primary channel 320 and the diameter D2P of the second primary channel 322 are both at least twice as great and less than or equal to ten times the diameter D1S of the first secondary channel 324 and twice as great and less than or equal to ten times the diameter D2S of the second secondary channel 336.

In one example embodiment, the diameters of the primary channels 320, 322 can be twice as great as the diameters D1S, D2S of the secondary channels 324, 336. In another example embodiment, the diameters of the primary channels 320, 322 can be two and a half times as great as the diameters D1S, D2S of the secondary channels 324, 336. In yet another example embodiment, the diameters of the primary channels 320, 322 can be three times as great as the diameters D1S, D2S of the secondary channels 324, 336. In a further example embodiment, the diameters of the primary channels 320, 322 can be four times as great as the diameters D1S, D2S of the secondary channels 324, 336. Unless otherwise specified, the diameters of the channels are in reference to the inner diameter of a given channel.

As depicted in FIG. 11 and noted above, the core 222 can be constructed of a plurality of unit cells 300 coupled with each other in flow communication. For instance, each unit cell 300 can be in flow communication with at least one adjacent unit cell. For example, the unit cell 300B is in flow communication with at least one adjacent unit cell. Particularly, the unit cell 300B is in flow communication with unit cell 300A, unit cell 300G, and unit cell 300C, which are all adjacent to the unit cell 300B.

As shown, the first primary channel 320 of the unit cell 300B is in flow communication with the first primary channel of the unit cell 300G and the second primary channel 322 of the unit cell 300B is in flow communication with the second primary channel of the unit cell 300G. The first secondary channel 324 of the unit cell 300B is in flow communication with the first secondary channel of the unit cell 300A and the first secondary channel of the unit cell 300C. For instance, the first side aperture 332 of the unit cell 300B can be in flow communication with the second side aperture of the unit cell 300A and the second side aperture 334 of the unit cell 300B can be in flow communication with the first side aperture of the unit cell C. In this way, the first secondary channel 324 of the unit cell 300B can be in flow communication with the first secondary channels of the unit cells 300A, 300C. The second secondary channel 336 of the unit cell 300B is in flow communication with the second secondary channel of the unit cell 300A and the second secondary channel of the unit cell 300C. For instance, the first side aperture 342 of the unit cell 300B can be in flow communication with the second side aperture of the unit cell 300A and the second side aperture 334 of the unit cell 300B can be in flow communication with the first side aperture of the unit cell C. In this way, the second secondary channel 336 of the unit cell 300B can be in flow communication with the second secondary channels of the unit cells 300A, 300C. As will be appreciated in considering FIG. 11, the channels of the other unit cells 300 can be in flow communication in a similar manner as provided in the example above.

Some of the unit cells 300 can include "dead ends". For instance, the unit cell 300A includes a dead end 346 associated with its first secondary channel and a dead end 348 associated with its second secondary channel. The dead ends 346, 348 operate as end points for the first and second secondary channels of the unit cell 300A. As depicted in FIG. 11, the unit cells 300E, 300F, and 300J all include dead ends as well.

The arrangement of the unit cells 300 of the core 222 may provide for a compact, high efficiency heat exchanger. The flow distribution grid created by the arrangement of the unit cells 300 may allow for enhanced heat transfer.

Specifically, the primary channels of the unit cells 300 allow for both fluids F1, F2 to flow in counterflow direction. For instance, the arrows representing the direction of flow of the first fluid F1 through the first primary channel of the unit cell 300G are pointing opposite the arrows representing the direction of flow of the second fluid F2 through the second primary channel of the unit cell 300G.

Further, the secondary channels allow for both fluids F1, F2 to flow in counterflow direction with each other and in counterflow direction within a given secondary channel. For instance, the arrows representing the direction of flow of the first fluid F1 through the first secondary channel of the unit cell 300G are pointing opposite the arrows representing the direction of flow of the second fluid F2 through the second secondary channel of the unit cell 300G at corresponding lateral locations. In this manner, the secondary channels allow for the fluids F1, F2 to flow in counterflow direction with each other. Also, as shown in zoomed-in cross section A in FIG. 11, the first fluid F1 flowing through the first conduit may be in counterflow direction as represented by the counter-pointing arrows. Similarly, as shown in zoomed-in cross section D in FIG. 11, the second fluid F2 flowing through the second conduit may be in counterflow direction, as represented by the counter-pointing arrows. In this regard, the secondary channels allow for the fluids F1, F2 to flow in counterflow direction within a given secondary channel.

In addition, on two diagonally-opposite sides of a given unit cell of the unit cells 300, or rather on a first set of diagonally-opposite sides, the secondary channels allow for crossflow arrangements that are perpendicular to the primary channel flow. For instance, as shown in zoomed-in cross section A in FIG. 11, the second fluid F2 flowing through the second primary channel 322 (into the page as represented by the "circled X's") is in crossflow direction with respect to the first fluid F1 flowing through the first secondary channel 324 as represented by the arrows. Also, as shown in zoomed-in cross section D in FIG. 11, the first fluid F1 flowing through the first primary channel 320 (out of the page as represented by the "circled dots") is in crossflow direction with respect to the second fluid F2 flowing through the second secondary channel 336 as represented by the arrows. In this regard, the secondary channels 324, 336 allow for crossflow arrangements that are perpendicular to the flow of fluid through the primary channels 320, 322. The first secondary channel 324 defined at least in part by the first conduit 330 traverses through the second primary channel 322 and the second secondary channel 336 defined at least in part by the second conduit 340 traverses through the first primary channel 320 at diagonally-opposite sides of the unit cell 300G.

On the two other diagonally-opposite sides of the given unit cell of the unit cells 300, or rather on a second set of diagonally-opposite sides, the junctions of the primary channels with their respective secondary channels allow for trifurcating flow arrangements. That is, at a given junction of a primary channel and secondary channel that are fluidly coupled, the fluid flows in three directions from the junction. For instance, as shown in zoomed-in cross section B in FIG. 11, the first primary channel 320 and the first secondary channel 324 are directly fluidly connected at a first junction 325. The first primary channel 320 and the first secondary channel 324 collectively form a trifurcating flow arrangement at the first junction 325. Specifically, the first fluid F1 flowing through the first primary channel 320 flows in a first direction from the first junction 325 (e.g., out of the page as represented by the "circled dot"). The first fluid F1 also flows in a second direction from the first junction 325 through the first secondary channel 324 as represented by the left-pointing arrow, and the first fluid F1 also flows in a third direction from the first junction 325 through the first secondary channel 324 as represented by the right-pointing arrow.

Also, as shown in zoomed-in cross section C in FIG. 11, the second primary channel 322 and the second secondary channel 336 are directly fluidly connected at a second junction 327. The second primary channel 322 and the second secondary channel 336 collectively form a trifurcating flow arrangement at the second junction 327. More specifically, the second fluid F2 flowing through the second primary channel 322 flows in a first direction from the second junction 327 (e.g., into the page as represented by the "circled X"). The second fluid F2 also flows in a second direction from the second junction 327 through the second secondary channel 336 as represented by the left-pointing arrow, and the second fluid F2 also flows in a third direction from the second junction 327 through the second secondary channel 336 as represented by the right-pointing arrow. Thus, the trifurcating flow arrangement at the first junction 325 and the trifurcating flow arrangement at the second junction 327 are at diagonally-opposite sides of the unit cell 300G.

To summarize, the flow distribution grid created by the arrangement of the unit cells of the core may allow for enhanced heat transfer by way of the counterflows, crossflows, and trifurcating flow arrangements described above. The first and second channels 224, 226 of the core 222 of FIG. 11 can have any suitable cross-sectional shape, such as a circular shape, a rectangular shape, a trapezoidal shape, etc.

With reference now to FIGS. 15, 16, 17, and 18, an alternative core of an exchanger unit of the heat exchanger 200 will now be described. The alternative core is configured in a similar manner as the core 222 described above with reference to FIGS. 11 through 14, except as provided below. Accordingly, the numerals used to identify parts of the core 222 of FIGS. 11 through 14 are used to identify like or similar part of the alternative core of FIGS. 15, 16, 17, and 18.

For this embodiment, in addition to the primary channels and the secondary channels, the core 222 includes or defines tertiary channels. Particularly, each unit cell 300 of the core 222 can define two tertiary channels in flow communication with the first primary channel and two tertiary channels in flow communication with the second primary channel. For the two tertiary channels in flow communication with the first primary channel, one of the tertiary channels is directly fluidly connected to the first primary channel while the other tertiary channel traverses through second primary channel and is in flow communication with the first primary channel via a first secondary channel. For the two tertiary channels in flow communication with the second primary channel, one of the tertiary channels is directly fluidly connected to the second primary channel while the other tertiary channel traverses through first primary channel and is in flow communication with the second primary channel via a second secondary channel. Each tertiary channel is arranged perpendicular to both the primary and secondary channels.

In some embodiments, the tertiary channels can extend lengthwise in a plane that is different than the plane in which the primary and secondary channels extend lengthwise. For example, the tertiary channels can extend lengthwise along the vertical direction V while the primary and secondary channels can extend in a horizontal plane that is perpendicular to the vertical direction V (e.g., the primary channels can extend lengthwise along the transverse direction T and the secondary channels can extend lengthwise along the lateral direction L). In other embodiments, the tertiary channels can extend lengthwise in a same plane as the primary channels but in a plane different than the secondary channels. For example, the tertiary channels can extend lengthwise along the lateral direction L, the primary channels can extend lengthwise along the transverse direction T, and the secondary channels can extend lengthwise along the vertical direction V.

Figure 15:
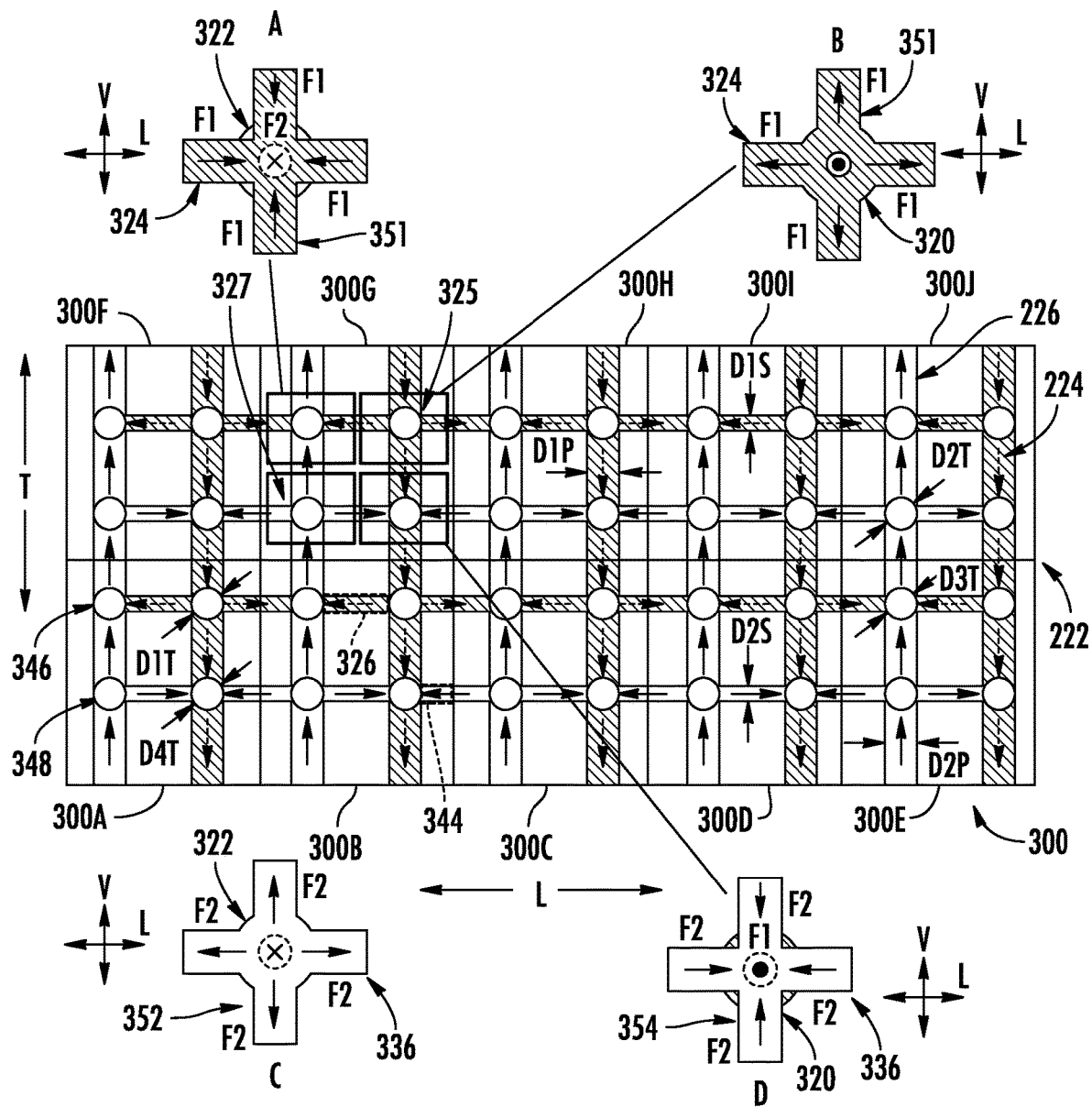
FIG. 15 provides a schematic cross-sectional view of a portion of a core of an exchanger unit for a heat exchanger in accordance with an example embodiment of the present disclosure.
Figure 16:
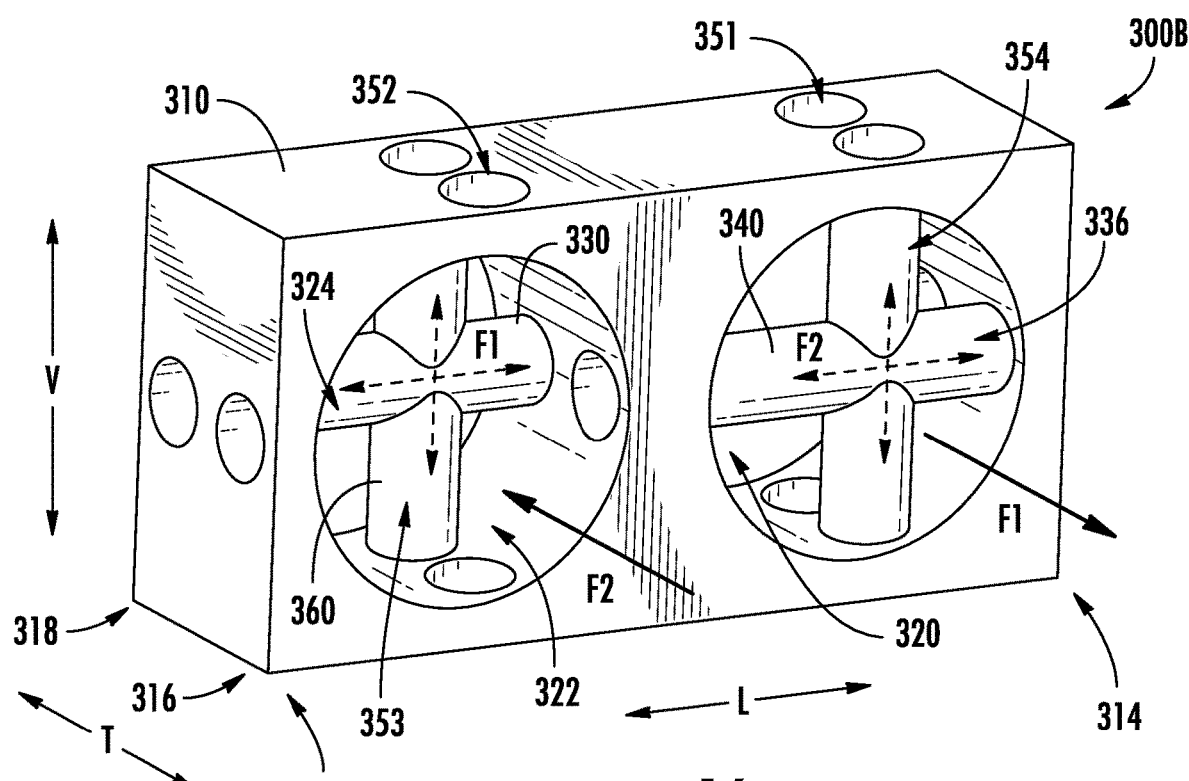
FIG. 16 provides a perspective view of one unit cell of the core of FIG. 15.
Figure 17:
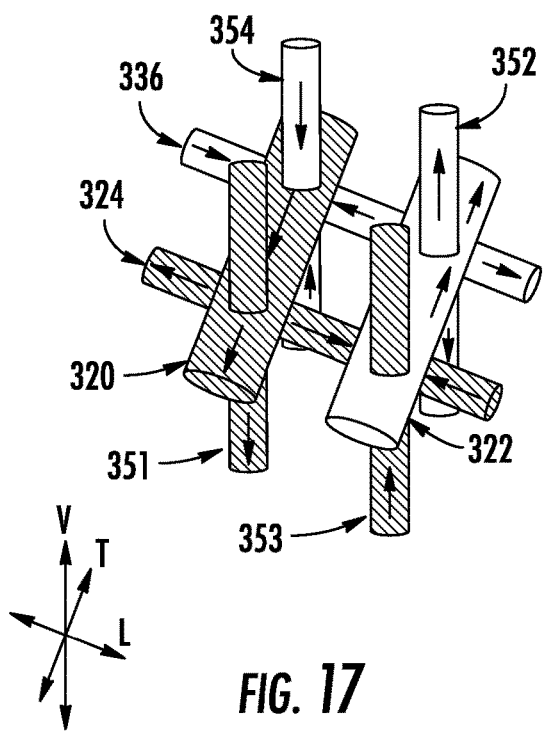
FIG. 17 provides a perspective view of the flow distribution of the unit cell of FIG. 16.
Figure 18:
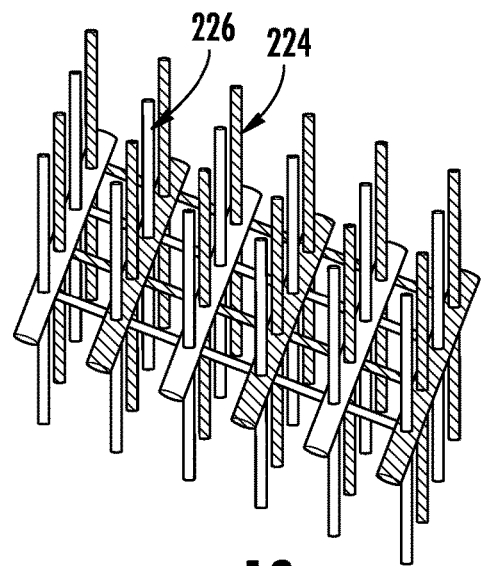
FIG. 18 provides a perspective view of the first and second channels of the core of FIG. 15.

As depicted in FIG. 16, the cell block 310 of the unit cell 300B defines two tertiary channels in flow communication with the first primary channel 320. Particularly, the cell block 310 of the unit cell 300B defines a first tertiary channel 351 associated with the first primary channel 320. The first tertiary channel 351 is configured to receive the first fluid F1 and is in flow communication with the first primary channel 320 and the first secondary channel 324. The first tertiary channel 351 is directly fluidly connected with the first primary channel 320. The first tertiary channel 351 has a diameter D1T (see unit cell 300A in FIG. 15) and spans between the top and the bottom of the cell block 310 along the vertical direction V.

The cell block 310 of the unit cell 300B also defines a third tertiary channel 353 associated with the first primary channel 320. The third tertiary channel 353 is configured to receive the first fluid F1 and is in flow communication with the first primary channel 320 and the first secondary channel 324. The third tertiary channel 353 is not directly fluidly connected with the first primary channel 320, but is in fluid communication with the first primary channel 320 by way of the first secondary channel 324. The third tertiary channel 353 has a diameter D3T (see unit cell 300E in FIG. 15) and spans between the top and the bottom of the cell block 310 along the vertical direction V. Notably, the third tertiary channel 353 traverses the second primary channel 322 and is directly fluidly connected to the first secondary channel 324 at a junction within the second primary channel 322. The third tertiary channel 353 and the first secondary channel 324 form a t-shape or cross within the second primary channel 322. The third tertiary channel 353 is arranged perpendicular to the first secondary channel 324 and the second primary channel 322.

The cell block 310 of the unit cell 300B depicted in FIG. 16 further defines two tertiary channels in flow communication with the second primary channel 322. Particularly, the cell block 310 of the unit cell 300B defines a second tertiary channel 352 associated with the second primary channel 322. The second tertiary channel 352 is configured to receive the second fluid F2 and is in flow communication with the second primary channel 322 and the second secondary channel 336. The second tertiary channel 352 is directly fluidly connected with the second primary channel 322. The second tertiary channel 352 has a diameter D2T (see unit cell 300J in FIG. 15) and spans between the top and the bottom of the cell block 310 along the vertical direction V.

The cell block 310 of the unit cell 300B also defines a fourth tertiary channel 354 associated with the second primary channel 322. The fourth tertiary channel 354 is configured to receive the second fluid F2 and is in flow communication with the second primary channel 322 and the second secondary channel 336. The fourth tertiary channel 354 is not directly fluidly connected with the second primary channel 322, but the fourth tertiary channel 354 is in fluid communication with the second primary channel 322 by way of the second secondary channel 336. The fourth tertiary channel 354 has a diameter D4T (see unit cell 300A in FIG. 15) and spans between the top and the bottom of the cell block 310 along the vertical direction V. Notably, the fourth tertiary channel 354 traverses the first primary channel 320 and is directly fluidly connected to the second secondary channel 336 at a junction within the first primary channel 320. The fourth tertiary channel 354 and the second secondary channel 336 form a t-shape or cross within the first primary channel 320. The fourth tertiary channel 354 is arranged perpendicular to both the second secondary channel 336 and the first primary channel 320.

As will be appreciated based on the teachings herein, the tertiary channels of a given unit cell 300 can be in flow communication with a corresponding tertiary channels of an adjacent unit cell of the unit cells 300. Further, it will be appreciated that the tertiary channels can be collectively formed by various apertures and conduits. For instance, as shown in FIG. 16, the third tertiary channel 353 is formed in part by a third conduit 360 that spans and traverses through the second primary channel 322 and the fourth tertiary channel 354 is formed in part by a fourth conduit 362 that spans and traverses through the first primary channel 320.

Further, in some embodiments, the diameters D1P, D2P of the first primary channel 320 and the second primary channel 322 are both greater than the diameters D1T, D2T, D3T, D4T of the tertiary channels 351, 352, 353, 354. For instance, in some embodiments, the diameter D1P of the first primary channel 320 and the diameter D2P of the second primary channel D2P are both at least twice as great as the diameters D1T, D2T, D3T, D4T of the tertiary channels 351, 352, 353, 354. In some embodiments, the diameter D1P of the first primary channel 320 and the diameter D2P of the second primary channel 322 are both at least twice as great and less than or equal to four times the diameters D1T, D2T, D3T, D4T of the tertiary channels 351, 352, 353, 354. In yet other embodiments, the diameter D1P of the first primary channel 320 and the diameter D2P of the second primary channel 322 are both at least twice as great and less than or equal to ten times the diameters D1T, D2T, D3T, D4T of the tertiary channels 3M, 352, 353, 354. In some embodiments, the diameters D1T, D2T, D3T, D4T of the tertiary channels 351, 352, 353, 354 can all be the same diameters. In some embodiments, the diameters D1T, D2T, D3T, D4T of the tertiary channels 351, 352, 353, 354 can all be the same as the diameters D1S, D2S of the secondary channels 324, 336.

The arrangement of the unit cells 300 of the core 222 of FIG. 15 may provide for a compact, high efficiency heat exchanger 200. The flow distribution grid created by the arrangement of the unit cells 300 may allow for enhanced heat transfer.

Specifically, the primary channels of the unit cells 300 allow for both fluids F1, F2 to flow in counterflow direction, as noted above. Further, the secondary channels allow for both fluids F1, F2 to flow in counterflow direction with each other and in counterflow direction within a given secondary channel. Likewise, the tertiary channels allow for both fluids F1, F2 to flow in counterflow direction with each other and in counterflow direction within a given tertiary channel.

In addition, on two diagonally-opposite sides of a given unit cell of the unit cells 300 of the core 222 of FIG. 15, or rather on a first set of diagonally-opposite sides, the secondary channels and the tertiary channels allow for double crossflow arrangements that are perpendicular to the primary channel flow. For instance, as shown in zoomed-in cross section A in FIG. 15, the second fluid F2 flowing through the second primary channel (into the page as represented by the "circled X's") is in crossflow direction with respect to the first fluid F1 flowing through the first secondary channel as represented by the arrows and in crossflow direction with respect to the first fluid F1 flowing through the third tertiary channel as represented by the arrows. Also, as shown in zoomed-in cross section D in FIG. 15, the first fluid F1 flowing through the first primary channel (out of the page as represented by the "circled dot") is in crossflow direction with respect to the second fluid F2 flowing through the second secondary channel as represented by the arrows and in crossflow direction with respect to the second fluid F2 flowing through the fourth tertiary channel as represented by the arrows. In this regard, the secondary channels and the tertiary channels allow for double crossflow arrangements that are perpendicular to the primary channel flow. The first secondary channel 324 defined at least in part by the first conduit 330 and the third tertiary channel 353 defined at least in part by the third conduit 360 traverse through the second primary channel 322 and the second secondary channel 336 defined at least in part by the second conduit 340 and the fourth tertiary channel 354 traverse through the first primary channel 320 at diagonally-opposite sides of the unit cell 300G.

On the two other diagonally-opposite sides of the given unit cell of the unit cells 300 of the core 222 of FIG. 15, or rather on a second set of diagonally-opposite sides, the junctions of the primary channels with their respective secondary channels and tertiary channels allow for pentafurcating flow arrangements. That is, at a given junction of a primary channel, a secondary channel, and a tertiary channel that are fluidly coupled, the fluid flows in five directions from the junction; hence, the pentafurcating flow arrangement. For instance, as shown in zoomed-in cross section B in FIG. 15, the first primary channel 320, the first secondary channel 324, and the first tertiary channel 351 are directly fluidly connected at a first junction 325. The first primary channel 320, the first secondary channel 324, and the first tertiary channel 351 collectively form a pentafurcating flow arrangement at the first junction 325. Specifically, the first fluid F1 flowing through the first primary channel flows in a first direction from the first junction 325 (e.g., out of the page as represented by the "circled dot"). The first fluid F1 also flows in a second direction from the first junction 325 through the first secondary channel 324 as represented by the left-pointing arrow. The first fluid F1 also flows in a third direction from the first junction 325 through the first secondary channel 324 as represented by the right-pointing arrow. Further, the first fluid F1 also flows in a fourth direction from the first junction 325 through the first tertiary channel 351 as represented by the upward-pointing arrow. Finally, the first fluid F1 also flows in a fifth direction from the first junction 325 through the first tertiary channel 351 as represented by the downward-pointing arrow.

Also, as shown in zoomed-in cross section C in FIG. 15, the second primary channel 322, the second secondary channel 336, and the second tertiary channel 352 are directly fluidly connected at a second junction 327. The second primary channel 322, the second secondary channel 336, and the second tertiary channel 352 collectively form a pentafurcating flow arrangement at the second junction 327. Specifically, the second fluid F2 flowing through the second primary channel 322 flows in a first direction from the second junction 327 (e.g., into the page as represented by the "circled X"). The second fluid F2 also flows in a second direction from the second junction 327 through the second secondary channel 336 as represented by the left-pointing arrow. The second fluid F2 also flows in a third direction from the second junction 327 through the second secondary channel 336 as represented by the right-pointing arrow. Further, the second fluid F2 also flows in a fourth direction from the second junction 327 through the second tertiary channel 352 as represented by the upward-pointing arrow. Finally, the second fluid F2 also flows in a fifth direction from the second junction 327 through the second tertiary channel 352 as represented by the downward-pointing arrow.

To summarize, the flow distribution grid created by the arrangement of the unit cells 300 of the core 222 of FIG. 15 may allow for enhanced heat transfer by way of the counterflows, crossflows, and pentafurcating flow arrangements described above. The first primary channels, the first secondary channels, and the first and third tertiary channels of the plurality of unit cells 300 of the core 222 of FIG. 15 collectively form the first channels 224 and the second primary channels, the second secondary channels, and the second and fourth tertiary channels of the plurality of unit cells 300 of the core 222 of FIG. 15 collectively form the second channels 226. The first and second channels 224, 226 of the core 222 of FIG. 15 can have any suitable cross-sectional shape, such as a circular shape, a rectangular shape, a trapezoidal shape, etc.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects are provided by the subject matter of the following clauses:

1. A turbine engine, comprising: a compressor section, a combustion section, and a turbine section in a serial flow arrangement; and a heat exchanger, comprising: a core having a unit cell defining a first primary channel, a second primary channel, a first secondary channel in flow communication with the first primary channel, and a second secondary channel in flow communication with the second primary channel, the first secondary channel traverses through the second primary channel and the second secondary channel traverses through the first primary channel.

1a. The turbine engine of any preceding clause, wherein the compressor section, the combustion section, and the turbine section are disposed along a core air flowpath of the turbine engine, and wherein the heat exchanger is in flow communication with the core air flowpath.

1b. The turbine engine of any preceding clause, wherein the compressor section, the combustion section, and the turbine section are disposed along a core air flowpath of the turbine engine, and wherein the heat exchanger is in flow communication with the core air flowpath at the compressor section.

2. The turbine engine of any preceding clause, wherein the first primary channel and the second primary channel are arranged parallel to one another and the first secondary channel and the second secondary channel are arranged perpendicular to the first primary channel and the second primary channel.

3. The turbine engine of any preceding clause, wherein the first primary channel and the first secondary channel are directly fluidly connected at a first junction and the second primary channel and the second secondary channel are directly fluidly connected at a second junction, and wherein the first primary channel and the first secondary channel collectively form a trifurcating flow arrangement at the first junction and the second primary channel and the second secondary channel collectively form a trifurcating flow arrangement at the second junction.

4. The turbine engine of any preceding clause, wherein the trifurcating flow arrangement at the first junction and the trifurcating flow arrangement at the second junction are at diagonally-opposite sides of the unit cell.

5. The turbine engine of any preceding clause, wherein the first secondary channel is defined at least in part by a first conduit that traverses through the second primary channel and the second secondary channel is defined at least in part by a second conduit that traverses through the first primary channel, and wherein the first conduit traverses through the second primary channel and the second conduit traverses through the first primary channel at diagonally-opposite side of the unit cell.

6. The turbine engine of any preceding clause, wherein the first primary channel has a diameter and the second primary channel has a diameter, and wherein the diameter of the first primary channel and the diameter of the second primary channel are both greater than diameters of the first secondary channel and the second secondary channel.

7. The turbine engine any preceding clause, wherein the diameter of the first primary channel and the diameter of the second primary channel are both at least twice as great and less than or equal to ten times the diameters of the first secondary channel and the second secondary channel.

8. The turbine engine of any preceding clause, wherein the unit cell is one of a plurality of unit cells that form the core, the plurality of unit cells being coupled with each other in flow communication, each unit cell of the plurality of unit cells defining a first primary channel in flow communication with a first primary channel of an adjacent unit cell of the plurality of unit cells, a second primary channel in flow communication with a second primary channel of the adjacent unit cell of the plurality of unit cells, a first secondary channel in flow communication with the first primary channel and in flow communication with a first secondary channel of the adjacent unit cell, and a second secondary channel in flow communication with the second primary channel and in flow communication with a second secondary channel of the adjacent unit cell, the first secondary channel traverses through the second primary channel and the second secondary channel traverses through the first primary channel.

9. The turbine engine of any preceding clause, wherein the heat exchanger further comprises a manifold having a housing and a partition wall that together define a first chamber and a second chamber, the first chamber and the second chamber being separated by the partition wall, the first chamber being in flow communication with the first primary channels of the plurality of unit cells, the manifold including a plurality of tubes that extend through the first chamber and the partition wall to provide flow communication between the second chamber and the second primary channels of the plurality of unit cells.

10. The turbine engine of any preceding clause, wherein the unit cell of the core defines a first tertiary channel in flow communication with the first primary channel and the first secondary channel and defines a third tertiary channel in flow communication with the first primary channel and the first secondary channel, wherein the third tertiary channel traverses through the second primary channel, and the first tertiary channel is directly fluidly connected with the first primary channel.

11. The turbine engine of any preceding clause, wherein the first primary channel, the first secondary channel, and the first tertiary channel are directly fluidly connected at a first junction, and wherein the first primary channel, the first secondary channel, and the first tertiary channel collectively form a pentafurcating flow arrangement at the first junction.

12. The turbine engine of any preceding clause, wherein the unit cell of the core defines a second tertiary channel in flow communication with the second primary channel and the second secondary channel and defines a fourth tertiary channel in flow communication with the second primary channel and the second secondary channel, wherein the fourth tertiary channel traverses through the first primary channel, and the second tertiary channel is directly fluidly connected with the second primary channel.

13. The turbine engine of any preceding clause, wherein the second primary channel, the second secondary channel, and the second tertiary channel are directly fluidly connected at a second junction, and wherein the second primary channel, the second secondary channel, and the second tertiary channel collectively form a pentafurcating flow arrangement at the second junction, and wherein the pentafurcating flow arrangement at the first junction and the pentafurcating flow arrangement at the second junction are at diagonally-opposite sides of the unit cell.

14. The turbine engine of any preceding clause, wherein the first tertiary channel and the third tertiary channel are both arranged perpendicular to the first primary channel and to the first secondary channel, and the second tertiary channel and the fourth tertiary channel are both arranged perpendicular to the second primary channel and to the second secondary channel.

15. The turbine engine of any preceding clause, wherein the first primary channel has a diameter, the second primary channel has a diameter, and the first tertiary channel, the second tertiary channel, the third tertiary channel, and the fourth tertiary channel each have diameters, and wherein the diameter of the first primary channel and the diameter of the second primary channel are both at least twice as great and less than or equal to ten times the diameters of the first tertiary channel, the second tertiary channel, the third tertiary channel, and the fourth tertiary channel.

16. A heat exchanger, comprising: a core having a plurality of unit cells in flow communication with one another, each unit cell of the plurality of unit cells defining at least two primary channels and at least two secondary channels arranged perpendicular to the at least two primary channels, a first secondary channel of the at least two secondary channels traverses through a second primary channel of the at least two primary channels and is directly fluidly connected to a first primary channel of the at least two primary channels at a first junction, a second secondary channel of the at least two secondary channels traverses through the first primary channel and is directly fluidly connected to the second primary channel at a second junction.

17. A heat exchanger, comprising: a core defining first channels and second channels; and a manifold having a housing and a partition wall that together define a first chamber and a second chamber, the first chamber and the second chamber being separated by the partition wall, the first chamber being in flow communication with the first channels, the manifold including a plurality of tubes that extend through the first chamber and the partition wall to provide flow communication between the second chamber and the second channels.

18. The heat exchanger of any preceding clause, wherein the manifold is a first manifold, and wherein the heat exchanger further comprises: a second manifold having a housing that defines a first chamber and a second chamber separated by a partition wall, the first chamber of the second manifold being in flow communication with the first channels, the second manifold including a plurality of tubes that extend through the first chamber and the partition wall of the second manifold to provide flow communication between the second chamber of the second manifold and the second channels.

19. The heat exchanger of any preceding clause, wherein the core and the manifold are components of a first exchanger unit of the heat exchanger, and wherein the heat exchanger further comprises: a second exchanger unit arranged to form an exchanger pair with the first exchanger unit, the second exchanger unit comprising: a core defining first channels and second channels; and a manifold having a housing that defines a third chamber and a fourth chamber separated by a partition wall, the third chamber being in flow communication with the first channels and the first chamber, the manifold of the second exchanger unit including a plurality of tubes that extend through the third chamber and the partition wall of the second exchanger unit to provide flow communication between the fourth chamber and the second channels, the fourth chamber being in flow communication with the second chamber of the first exchanger unit.

20. The heat exchanger of any preceding clause, wherein the core and the manifold are components of a first exchanger unit of the heat exchanger, and wherein the heat exchanger further comprises: a second exchanger unit arranged to form an exchanger pair with the first exchanger unit, the second exchanger unit comprising: a core defining first channels and second channels; and a manifold having a housing that defines a third chamber and a fourth chamber separated by a partition wall, the third chamber being in flow communication with the first channels of the core of the second exchanger unit, the manifold of the second exchanger unit including a plurality of tubes that extend through the third chamber and the partition wall of the second exchanger unit to provide flow communication between the fourth chamber and the second channels of the core of the second exchanger unit, and wherein the third chamber is not in flow communication with the first chamber, and the fourth chamber is not in flow communication with the second chamber.

21. The heat exchanger of any preceding clause, wherein the core and the manifold are components of a first exchanger unit of the heat exchanger, and wherein the manifold is a first manifold, and wherein the first heat exchanger further comprises a second manifold having a housing that defines a first chamber and a second chamber separated by a partition wall, the first chamber of the second manifold being in flow communication with the first channels, the second manifold including a plurality of tubes that extend through the first chamber and the partition wall of the second manifold to provide flow communication between the second chamber of the second manifold and the second channels, and wherein the heat exchanger further comprises: a second exchanger unit arranged to form an exchanger pair with the first exchanger unit, the second exchanger unit comprising: a core defining first channels and second channels; and a first manifold having a housing that defines a third chamber and a fourth chamber separated by a partition wall, the third chamber being in flow communication with the first channels of the core of the second exchanger unit, the first manifold of the second exchanger unit including a plurality of tubes that extend through the third chamber and the partition wall of the first manifold of the second exchanger unit to provide flow communication between the fourth chamber and the second channels of the core of the second exchanger unit; and a second manifold having a housing that defines a third chamber and a fourth chamber separated by a partition wall, the third chamber of the second manifold of the second exchanger unit being in flow communication with the first channels of the core of the second exchanger unit, the second manifold of the second exchanger unit including a plurality of tubes that extend through the third chamber and the partition wall of the second manifold of the second exchanger unit to provide flow communication between the fourth chamber of the second manifold and the second channels of the core of the second exchanger unit, and wherein the first chamber of the first manifold of the first exchanger unit is not in flow communication with the third chamber of the first manifold of the second exchanger unit and the second chamber of the first manifold of the first exchanger unit is not in flow communication with the fourth chamber of the first manifold of the second exchanger unit, and wherein the first chamber of the second manifold of the first exchanger unit is in flow communication with the third chamber of the second manifold of the second exchanger unit and the second chamber of the second manifold of the first exchanger unit is in flow communication with the fourth chamber of the second manifold of the second exchanger unit.

22. The heat exchanger of any preceding clause, wherein the first exchanger unit has a first port allowing for flow communication into or out of the first chamber and a second port allowing for flow communication into or out of the second chamber, and wherein the second exchanger unit has a third port allowing for flow communication into or out of the third chamber and a fourth port allowing for flow communication into or out of the fourth chamber.

I claim:

1. A turbine engine, comprising:
a compressor section, a combustion section, and a turbine section in a serial flow arrangement; and
a heat exchanger comprising:
a core having a unit cell defining a first primary channel, a second primary channel, a first secondary channel in flow communication with the first primary channel, and a second secondary channel in flow communication with the second primary channel, the first secondary channel traverses through the second primary channel and the second secondary channel traverses through the first primary channel, wherein the first primary channel and the first secondary channel are directly fluidly connected at a first junction and the second primary channel and the second secondary channel are directly fluidly connected at a second junction, and wherein the first primary channel and the first secondary channel collectively form a trifurcating flow arrangement at the first junction and the second primary channel and the second secondary channel collectively form a trifurcating flow arrangement at the second junction.

2. The turbine engine of claim 1, wherein the first primary channel and the second primary channel are arranged parallel to one another and the first secondary channel and the second secondary channel are arranged perpendicular to the first primary channel and the second primary channel.

3. The turbine engine of claim 1, wherein the trifurcating flow arrangement at the first junction and the trifurcating flow arrangement at the second junction are at diagonally-opposite sides of the unit cell.

4. The turbine engine of claim 1, wherein the first secondary channel is defined at least in part by a first conduit that traverses through the second primary channel and the second secondary channel is defined at least in part by a second conduit that traverses through the first primary channel, and wherein the first conduit traverses through the second primary channel and the second conduit traverses through the first primary channel at diagonally-opposite side of the unit cell.

5. The turbine engine of claim 1, wherein the first primary channel has a diameter and the second primary channel has a diameter, and wherein the diameter of the first primary channel and the diameter of the second primary channel are both greater than diameters of the first secondary channel and the second secondary channel.

6. The turbine engine of claim 5, wherein the diameter of the first primary channel and the diameter of the second primary channel are both at least twice as great and less than or equal to ten times the diameters of the first secondary channel and the second secondary channel.

7. The turbine engine of claim 1, wherein the unit cell is one of a plurality of unit cells that form the core, the plurality of unit cells being coupled with each other in flow communication, each unit cell of the plurality of unit cells defining a first primary channel in flow communication with a first primary channel of an adjacent unit cell of the plurality of unit cells, a second primary channel in flow communication with a second primary channel of the adjacent unit cell of the plurality of unit cells, a first secondary channel in flow communication with the first primary channel and in flow communication with a first secondary channel of the adjacent unit cell, and a second secondary channel in flow communication with the second primary channel and in flow communication with a second secondary channel of the adjacent unit cell, the first secondary channel traverses through the second primary channel and the second secondary channel traverses through the first primary channel.

8. The turbine engine of claim 7, wherein the heat exchanger further comprises a manifold having a housing and a partition wall that together define a first chamber and a second chamber, the first chamber and the second chamber being separated by the partition wall, the first chamber being in flow communication with the first primary channels of the plurality of unit cells, the manifold including a plurality of tubes that extend through the first chamber and the partition wall to provide flow communication between the second chamber and the second primary channels of the plurality of unit cells.

9. The turbine engine of claim 1, wherein the unit cell of the core defines a first tertiary channel in flow communication with the first primary channel and the first secondary channel and defines a third tertiary channel in flow communication with the first primary channel and the first secondary channel, wherein the third tertiary channel traverses through the second primary channel, and the first tertiary channel is directly fluidly connected with the first primary channel.

10. The turbine engine of claim 9, wherein the first primary channel, the first secondary channel, and the first tertiary channel are directly fluidly connected at a first junction, and wherein the first primary channel, the first secondary channel, and the first tertiary channel collectively form a pentafurcating flow arrangement at the first junction.

11. The turbine engine of claim 10, wherein the unit cell of the core defines a second tertiary channel in flow communication with the second primary channel and the second secondary channel and defines a fourth tertiary channel in flow communication with the second primary channel and the second secondary channel, wherein the fourth tertiary channel traverses through the first primary channel, and the second tertiary channel is directly fluidly connected with the second primary channel.

12. The turbine engine of claim 11, wherein the second primary channel, the second secondary channel, and the second tertiary channel are directly fluidly connected at a second junction, and wherein the second primary channel, the second secondary channel, and the second tertiary channel collectively form a pentafurcating flow arrangement at the second junction, and wherein the pentafurcating flow arrangement at the first junction and the pentafurcating flow arrangement at the second junction are at diagonally-opposite sides of the unit cell.

13. The turbine engine of claim 12, wherein the first tertiary channel and the third tertiary channel are both arranged perpendicular to the first primary channel and to the first secondary channel, and the second tertiary channel and the fourth tertiary channel are both arranged perpendicular to the second primary channel and to the second secondary channel.

14. The turbine engine of claim 11, wherein the first primary channel has a diameter, the second primary channel has a diameter, and the first tertiary channel, the second tertiary channel, the third tertiary channel, and the fourth tertiary channel each have diameters, and wherein the diameter of the first primary channel and the diameter of the second primary channel are both at least twice as great and less than or equal to ten times the diameters of the first tertiary channel, the second tertiary channel, the third tertiary channel, and the fourth tertiary channel.

15. A turbine engine, comprising:
  a compressor section, a combustion section, and a turbine section in a serial flow arrangement; and
  a heat exchanger comprising:
    a core having a unit cell defining a first primary channel, a second primary channel, a first secondary channel in flow communication with the first primary channel, and a second secondary channel in flow communication with the second primary channel, the first secondary channel traverses through the second primary channel and the second secondary channel traverses through the first primary channel, wherein the unit cell is one of a plurality of unit cells that form the core, the plurality of unit cells being coupled with each other in flow communication, each unit cell of the plurality of unit cells defining a first primary channel in flow communication with a first primary channel of an adjacent unit cell of the plurality of unit cells, a second primary channel in flow communication with a second primary channel of the adjacent unit cell of the plurality of unit cells, a first secondary channel in flow communication with the first primary channel and in flow communication with a first secondary channel of the adjacent unit cell, and a second secondary channel in flow communication with the second primary channel and in flow communication with a second secondary channel of the adjacent unit cell, the first secondary channel traverses through the second primary channel and the second secondary channel traverses through the first primary channel.

16. The turbine engine of claim 15, wherein the heat exchanger further comprises a manifold having a housing and a partition wall that together define a first chamber and a second chamber, the first chamber and the second chamber being separated by the partition wall, the first chamber being in flow communication with the first primary channels of the plurality of unit cells, the manifold including a plurality of tubes that extend through the first chamber and the partition wall to provide flow communication between the second chamber and the second primary channels of the plurality of unit cells.

17. A turbine engine, comprising:
  a compressor section, a combustion section, and a turbine section in a serial flow arrangement; and
  a heat exchanger comprising:
    a core having a unit cell defining a first primary channel, a second primary channel, a first secondary channel in flow communication with the first primary channel, and a second secondary channel in flow communication with the second primary channel, the first secondary channel traverses through the second primary channel and the second secondary channel traverses through the first primary channel, wherein the unit cell of the core defines a first tertiary channel in flow communication with the first primary channel and the first secondary channel and defines a third tertiary channel in flow communication with the first primary channel and the first secondary channel, wherein the third tertiary channel traverses through the second primary channel, and the first tertiary channel is directly fluidly connected with the first primary channel.

18. The turbine engine of claim 17, wherein the first primary channel, the first secondary channel, and the first tertiary channel are directly fluidly connected at a first junction, and wherein the first primary channel, the first secondary channel, and the first tertiary channel collectively form a pentafurcating flow arrangement at the first junction.

19. The turbine engine of claim 18, wherein the unit cell of the core defines a second tertiary channel in flow communication with the second primary channel and the second secondary channel and defines a fourth tertiary channel in flow communication with the second primary channel and the second secondary channel, wherein the fourth tertiary channel traverses through the first primary channel, and the second tertiary channel is directly fluidly connected with the second primary channel.

* * * * *